(12) United States Patent
Husain et al.

(10) Patent No.: US 9,389,825 B2
(45) Date of Patent: Jul. 12, 2016

(54) ZERO CLIENT DEVICE WITH INTEGRATED VIRTUAL PRIVATE NETWORK CAPABILITY

(75) Inventors: Syed Mohammad Amir Husain, Round Rock, TX (US); Randy P. Printz, Kingsland, TX (US); Rajesh K. Mellacheruvu, Austin, TX (US)

(73) Assignee: ClearCube Technology, Inc., Austin, TX (US)

( * ) Notice: Subject to any disclaimer, the term of this patent is extended or adjusted under 35 U.S.C. 154(b) by 224 days.

(21) Appl. No.: 13/491,028

(22) Filed: Jun. 7, 2012

(65) Prior Publication Data

US 2012/0317178 A1   Dec. 13, 2012

Related U.S. Application Data

(60) Provisional application No. 61/494,192, filed on Jun. 7, 2011, provisional application No. 61/545,640, filed on Oct. 11, 2011.

(51) Int. Cl.
*G06F 15/16* (2006.01)
*G06F 3/14* (2006.01)
(Continued)

(52) U.S. Cl.
CPC ............... *G06F 3/14* (2013.01); *G06F 9/4445* (2013.01); *H04L 29/06306* (2013.01); *H04L 29/06326* (2013.01); *H04L 29/08081* (2013.01); *H04L 29/08783* (2013.01); *H04L 29/08927* (2013.01); *H04L 41/08* (2013.01);
(Continued)

(58) Field of Classification Search
CPC ................ H04L 29/00; G06F 29/00

USPC .................................. 709/203, 218
See application file for complete search history.

(56) References Cited

U.S. PATENT DOCUMENTS 7,269,849 B2   9/2007   Savini
7,428,754 B2   9/2008   Neumann et al.
(Continued)

OTHER PUBLICATIONS

PanoLogic, "Thin vs. Zero", 2012, propalms.com/download/documentation/pano/benefit-briefs/PanoLogic_BB_ThinvsZero.pdf, PanoLogic, p. 1-2.*

(Continued)

*Primary Examiner* — Taylor Elfervig
*Assistant Examiner* — Messeret Gebre
(74) *Attorney, Agent, or Firm* — Meyertons Hood Kivlin Kowert & Goetzel, P.C.; Jeffrey C. Hood; Mark S. Williams

(57) ABSTRACT

System and method for zero client communications. A zero client device includes a housing, and in the housing, a transcoding processing unit (transcoder) and a communications processing unit coupled to the transcoder. The transcoder is configured to receive input data from human interface device(s), encode the input data, and provide the encoded input data to the communications processing unit for transmission over a network to a server. The communications processing unit is configured to receive the encoded input data from the transcoder, transmit the encoded input data over the network to the server, receive output data from the server, and send the output data to the transcoder. The transcoder is further configured to receive the output data from the communications processing unit, decode the output data, and send the decoded output data to at least one of the human interface devices.

5 Claims, 12 Drawing Sheets

(51) Int. Cl.
   *H04L 29/08*     (2006.01)
   *H04L 29/06*     (2006.01)
   *H04L 12/24*     (2006.01)
   *G06F 9/44*      (2006.01)

(52) U.S. Cl.
   CPC .......... *H04L 41/0803* (2013.01); *H04L 41/28* (2013.01); *H04L 65/1083* (2013.01); *H04L 67/10* (2013.01); *H04L 67/125* (2013.01); *H04L 67/14* (2013.01); *H04L 67/36* (2013.01); *H04L 67/38* (2013.01); *H04L 69/08* (2013.01); *H04L 69/12* (2013.01); *H04L 69/18* (2013.01); *G06F 3/1438* (2013.01); *G06F 3/1454* (2013.01); *G09G 2358/00* (2013.01); *G09G 2370/022* (2013.01); *G09G 2370/16* (2013.01); *G09G 2370/24* (2013.01)

(56) References Cited

U.S. PATENT DOCUMENTS

| | | | |
|---|---|---|---|
| 7,469,294 B1 * | 12/2008 | Luo et al. ...................... | 709/229 |
| 7,992,201 B2 * | 8/2011 | Aldridge et al. ............... | 726/15 |
| 8,015,406 B2 | 9/2011 | Lonardo et al. | |
| 8,082,228 B2 * | 12/2011 | Mu .............................. | 707/650 |
| 8,201,732 B1 * | 6/2012 | Kropf .................. | G06Q 20/108 |
| | | | 235/379 |
| 2005/0198532 A1 | 9/2005 | Comlekoglu et al. | |
| 2006/0041761 A1 | 2/2006 | Neumann et al. | |
| 2008/0092217 A1 * | 4/2008 | Nagami et al. .................... | 726/5 |
| 2008/0243854 A1 * | 10/2008 | Noguchi ............. | G06F 21/6218 |
| 2010/0157524 A1 * | 6/2010 | Soffer ...................... | 361/679.58 |
| 2011/0126198 A1 * | 5/2011 | Vilke et al. ........................ | 718/1 |
| 2012/0229703 A1 * | 9/2012 | Sartori et al. ................ | 348/500 |
| 2012/0246458 A1 * | 9/2012 | Jain et al. ...................... | 713/100 |

OTHER PUBLICATIONS

Tristan Richardson, Quentin Stafford-Fraser, Kenneth R. Wood, and Andy Hopper* The Olivetti & Oracle Research Laboratory, "Virtual Network Computing", 1998.*

D. Zinca, "Design of a modified RFB protocol and its implementation in an ultra-thin client," Electronics and Telecommunications (ISETC), 2010 9th International Symposium on, Timisoara, 2010, pp. 157-160.*

"Redar: a remote desktop architecture for the distributed virtual personal computing"; Proceedings Fifth International Conference on Grid and Cooperative Computing: 8 . IEEE Computer Society. (2006).*

Lien Deboosere, "Self management of a mobile thin client service"; Lien Deboosere, Bert Vankeirsbilck, Pieter Simoens, Filip De Turck, Bart Dhoedt, Piet Demeester Aug. 2009 MobiHeld '09: Proceedings of the 1st ACM workshop on Networking, systems, and applications for mobile handhelds.*

* cited by examiner

ZERO CLIENT DEVICE WITH INTEGRATED VIRTUAL PRIVATE NETWORK CAPABILITY

PRIORITY DATA

This application claims benefit of priority to U.S. Provisional Application Ser. No. 61/494,192, titled "Zero Client, Secure Switching, and Mobility Functionality in a Networked Computer System", filed Jun. 7, 2011, whose inventors are Syed Mohammad Amir Husain and Randy P. Printz, which is hereby incorporated by reference in its entirety as though fully and completely set forth herein.

This application also claims benefit of priority to U.S. Provisional Application Ser. No. 61/545,640, titled "Zero Client, Secure Switching, and Mobility Functionality in a Networked Computer System", filed Oct. 11, 2011, whose inventors are Syed Mohammad Amir Husain and Randy P. Printz, which is hereby incorporated by reference in its entirety as though fully and completely set forth herein.

FIELD OF THE INVENTION

The present invention relates generally to networked computing systems in which a plurality of human interfaces are coupled via a network to a plurality of computer systems, e.g., co-located or centralized computers, e.g., blade computers, and more specifically, to various embodiments of a zero client system implementing such interfaces.

DESCRIPTION OF THE RELATED ART

Many commercial businesses and enterprises make extensive use of personal computers (PCs) in their daily operations. Typically, each user of a PC in the enterprise has a networked PC at his/her desk or work area. As the number of networked computer systems utilized in an enterprise increases, the management of resources in the network may become increasingly complex and expensive. Some of the manageability issues involved in maintaining a large number of networked computer systems may include ease of installation and deployment, the topology and physical logistics of the network, asset management, scalability (the cost and effort involved in increasing the number of units), troubleshooting network or unit problems, support costs, software tracking and management, as well as the simple issue of physical space, be it floor space or room on the desktop, as well as security issues regarding physical assets, information protection, software control, and computer virus issues.

Many of these issues may be addressed by centralizing the locations of the PCs, such as by installing multiple PCs into a central frame or cabinet, and locating each PC's human interface (e.g., keyboard, display device, mouse, etc.) at a respective remote location, e.g., more than 10 or 20 feet from the computing system. In one approach, each computer in the system may be a "computer on a card", also referred to as a computer blade or "blade". In other words, each computer may be comprised on a circuit card that may include standard computing system components such as a CPU, memory, power supply, and network interface, as well as an extender, e.g., a USB or PCI extender, for communicating with the remote human interface. A computing system in which a plurality of human interfaces are coupled via a network to a plurality of centralized computer blades is referred to herein as a blade computing system.

One type of networked computing system that is increasingly utilized is referred to as a "cloud system", in which multiple users access server-provided computer resources over a network, e.g., storage, processing tasks, applications, etc. Client systems coupled to the "cloud" may utilize provided resources without regard to which server (or even how many servers) provides the resources.

Some network based computing systems implement or utilize particular types of client/server architecture referred to as thin client or zero client. Thin and zero clients rely substantially or entirely upon the server for performing data processing tasks. The thin or zero client supports user interface functionality, e.g., presenting information to the user, e.g., via display, speakers, etc., receiving user input from the user via input devices, and providing user input to the server, etc., while the server performs most or all of the data processing. Note that thin clients may run a full operating system (OS), whereas zero clients generally do not, e.g., a zero client's OS may be a minimal or stripped down OS, such as a kernel that primarily initializes network communications/protocol and manages/displays I/O to and from the server(s) over the network. A cloud client may be considered a subtype of zero client.

Another current trend in computer network technologies is the use of virtual machines. Virtual machines (VMs) are software processes or environments that implement a "computer within a computer", where, for example, the VM may execute a different operating system or even instruction set from its host computer. A client (and its user) may interact with and perceive the VM as a physical machine, although it is actually a software process.

However, in prior art zero client systems and VMs, there are numerous functionalities that are not implemented, and thus not available to users of these systems.

SUMMARY

Various embodiments of a zero client device are described. The zero client device may include a housing, a transcoding processing unit included in the housing, and a communications processing unit, also included in the housing and coupled to the transcoding processing unit. Being a zero client device, it has no user-modifiable storage medium, although it may include various memory elements for operation of the device. Similarly, the device does not include a conventional operation system. The transcoding processing unit and the communications processing unit may be implemented on respective circuit boards, i.e., on a first circuit board and on a second circuit board, respectively.

in some embodiments, a zero client device may include a housing, a transcoding processing unit included in the housing, and a communications processing unit, also included in the housing and coupled to the transcoding processing unit. Being a zero client device, it has no user-modifiable storage medium, although it may include various memory elements for operation of the device. Similarly, the device does not include a conventional operation system.

The transcoding processing unit or the communications processing unit may instantiate a zero client session with a server or other network accessible device over a network. In some embodiments, the transcoding processing unit may be configured to receive input data from one or more human interface devices, encode the input data, and provide the encoded input data to the communications processing unit for transmission over the network to the server.

The communications processing unit may be configured to receive the encoded input data from the transcoding processing unit, transmit the encoded input data over the network to the server, receive output data from the server over the network, and send the output data to the transcoding processing unit.

The transcoding processing unit may be further configured to receive the output data from the communications processing unit, decode the output data, and send the decoded output data to at least one of the one or more human interface devices.

Note that the above is but one exemplary embodiment, and that other embodiments are also contemplated, as described below. For example, in various embodiments, various functionalities may be integrated into the zero client device, including, for example, one or more of: Virtual Private Network (VPN) functionality for securely connecting to a server over a network, network authentication capability, wireless capability, assignment of an IP address to the zero client device based on a MAC address, one or more serial or parallel ports, USB bandwidth augmentation and support for out-of-band capabilities, multiple display adaptors, remoting hardware, and I/O devices to extend display capabilities, Bluetooth capability, GPS (Global Positioning System) capability, multi-boot capability to allow use of multiple zero client protocols from the same zero client device, secure KVM (keyboard/video/mouse) switching capability, or a network controlled serial/audio switch, among others.

BRIEF DESCRIPTION OF THE DRAWINGS

A better understanding of the present invention can be obtained when the following detailed description of the embodiment is considered in conjunction with the following drawings, in which.

Figure 1:
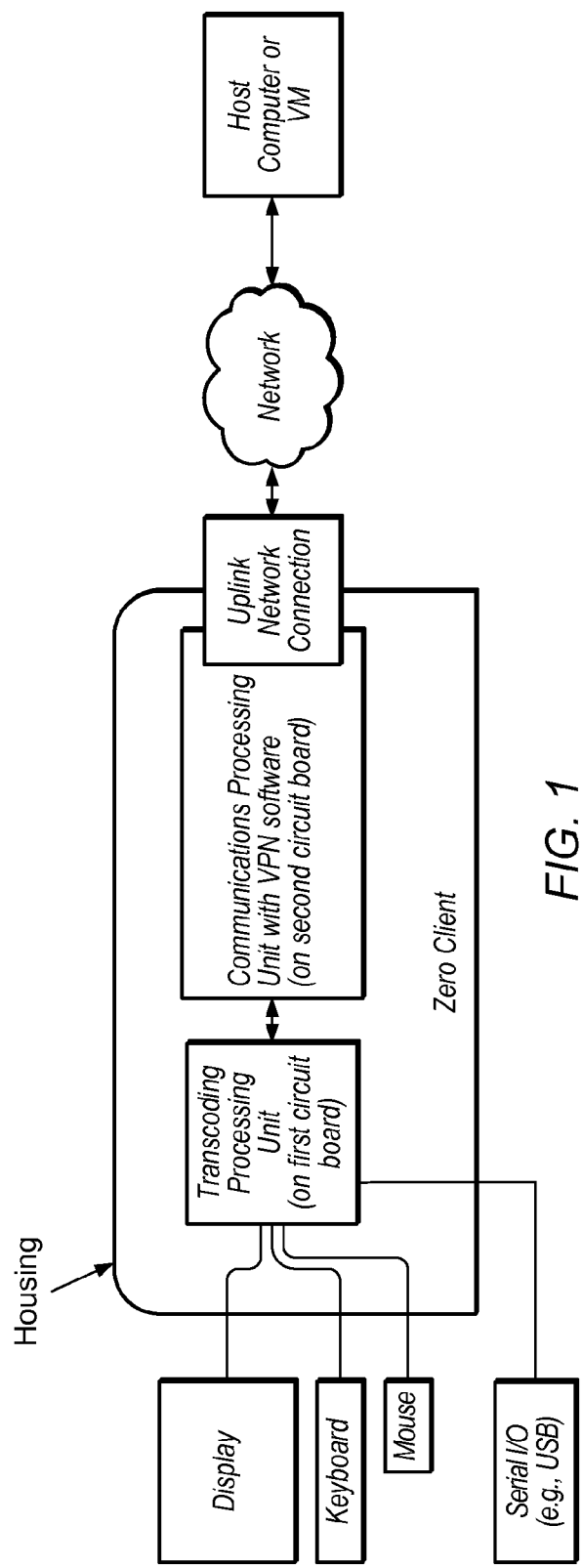
FIG. 1 illustrates integration of Virtual Private Network (VPN) capability into a zero client device, according to one embodiment.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF EMBODIMENTS

As used herein, the term "zero client" refers to an endpoint device which does not have a conventional operating system, has no removable storage, and has no independent operational capability other than acting as a decoder or receiver for a computing experience that executes on a remote server, workstation, or blade computer, and is transmitted over a network to the zero client. The protocols employed to transmit and decode this experience may include PCoIP, HDX, RemoteFX, or others, as desired. The terms "processing unit" and "functional unit" refer to any type of computational element, such as a processor (embedded or otherwise), application specific integrated circuit (ASIC), or Field Programmable Gate Array (FPGA), among others. As noted above, a cloud client is considered to be a subtype of zero client, and may support or implement a cloud specific protocol to communicate with a cloud over a network.

Below are presented descriptions of innovative systems and techniques that provide benefits not available in the prior art. It should be noted that in various different embodiments, any of the various features and functionalities described below may be used or omitted. In other words, any and all different combinations and subsets of the features and functionalities disclosed herein are contemplated and considered to be within the scope of this document.

Zero Client System

Typically a zero client device accepts input from a user or from a program, which may be referred to as a connection broker, to determine which host system (remote server) it is to connect to. To enable various of the functions and novel features described herein, such as out-of-band USB ports, additional displays via USB to video adaptors, and so forth, a zero client device is described that includes a transcoding processing unit (described in detail below) and a secondary processing unit, e.g., an embedded processor (referred to herein as a communications processing unit, and described in detail below) is necessitated.

In some embodiments, the transcoding processing unit may be implemented on a first circuit board, and the communications processing unit may be implemented on a second (separate) circuit board. This particular novel architecture may facilitate or even necessitate various functions and functionalities disclosed herein.

In some embodiments, software (i.e., program instructions) may be provided that runs on (or is configured on) the communications processing unit which is executable or configured to a) detect the connection state of the zero client transcoding processing unit b) if the zero client transcoding processing unit is connected to a remote host, obtain the IP address or hostname of the remote host, and c) initiate a connection to a host process (e.g., software program) which may be pre-installed on the remote host to enable the out-of-band communication channel.

This capability may thus alleviate the need for an end-user to manually connect the zero client transcoding processing unit to a host, and then also launch a secondary manual connection to enable the communications processing unit to connect to the same host. In fact, in many environments, the end user may not even be aware of the hostname or the IP address of the remote system to which he/she is connecting. This automatic detection of a remote host and automatic out-of-band connection instantiation process provides significant benefits over the prior art.

Accordingly, in some embodiments, a zero client device may include a housing, a transcoding processing unit included in the housing, and a communications processing unit, also included in the housing and coupled to the transcoding processing unit. Being a zero client device, it has no user-modifiable storage medium, although it may include various memory elements for operation of the device. Similarly, the device does not include a conventional operation system.

The transcoding processing unit or the communications processing unit may instantiate a zero client session with a server, or other network accessible device over a network.

In some embodiments, the transcoding processing unit may be configured to receive input data from one or more human interface devices, encode the input data, and provide the encoded input data to the communications processing unit for transmission over the network to the server.

The communications processing unit may be configured to receive the encoded input data from the transcoding processing unit, transmit the encoded input data over the network to the server, receive output data from the server over the network, and send the output data to the transcoding processing unit.

The transcoding processing unit may be further configured to receive the output data from the communications processing unit, decode the output data, and send the decoded output data to at least one of the one or more human interface devices.

Note that the above is but one exemplary embodiment, and that other embodiments are also contemplated, as described below.

It should be further noted that the various techniques and systems disclosed herein may include new combinations of hardware devices and new software (which may include program instructions implemented in programmable hardware, such as an FPGA) that utilizes the devices to provide novel and useful functionality. Thus, for example, in some embodiments, the novelty of the systems and methods disclosed is not limited merely to the described combinations of the hardware, but also includes special software that automates the workflow required to detect the remote system to which the zero client transcoding processing unit is connected, and to cause the communications processing unit (e.g., embedded processor) that handles out-of-band communication for USB, USB 2 VGA, USB 2 Parallel, or other forms of communication, to connect to the same remote host. Accordingly, appropriate software may be resident or available on the remote host to facilitate this connection. In other words, the remote host may include server software such that the out-of-band connection has a server process to connect to which enables the transit of data between remotely connected ports/peripherals (of the zero client device) and the host with which the zero client transcoding processing unit has established a user session/connection.

FIG. 1—Integration of VPN Capability into a Zero Client Device

FIG. 1 illustrates one embodiment of a novel architecture for a client system, such as a zero client device, which may be referred to herein for brevity as simply the "client". More specifically, FIG. 1 illustrates integration of Virtual Private Network (VPN) capability into a zero client device, according to one embodiment. In preferred embodiments, the zero client device is comprised in a housing, i.e., a case or enclosure, with electrical and data connections or ports for connecting to other devices.

As FIG. 1 shows, in this embodiment, a zero client may be configured to couple to a host computer or VM over a network, e.g., the Internet, a Local Area Network (LAN), etc., and may be further configured to couple to various human interface devices (HIDs), e.g., a display, keyboard, and mouse (or any other human interface device(s), as desired), as well as one or more serial (e.g., USB) devices, as indicated by the serial I/O element. It should be noted, however, that the embodiment shown is meant to be exemplary only, and is not intended to limit the client or its connectivity to any particular set if HIDs, any particular network, or any particular type of host computer or VM. Moreover, the host computer or VM may be comprised in any of various networked computer systems, e.g., may be part of a cloud system, a co-located blade computer system, localized or distributed data center, etc., as desired.

As shown, in one embodiment the client may include a transcoding processing unit, included in the housing and implemented on a first circuit board, as well as a communications processing unit, also included in the housing, and coupled to the transcoding processing unit. The communications processing unit may be implemented on a second circuit board. In various embodiments, the transcoding processing unit may be implemented as an FPGA, an ASIC, and/or a processor, among others, as desired. The transcoding processing unit may be configured to perform decoding of a video signal received from a source computer or virtual machine, an audio signal received from a host, i.e., a source computer or virtual machine, and/or additional signals from the host, as a USB (Universal Serial Bus) or peripheral bus signal). As noted above, the zero client device may have no user-modifiable storage medium.

The communications processing unit may also be implemented in any of various ways, e.g., a processor, an FPGA, and/or an ASIC, among others. The communications processing unit may include Virtual Private Network (VPN) software for securely connecting to devices over a network. In one exemplary embodiment, the communications processing unit may be or include an embedded processor running VPN (Virtual Private Networking) software that functions as an Internet (or other network) gateway for the transcoding processing unit, where the VPN software is stored or implemented in firmware or other type of memory in or of the communications processing unit. Note, however, that in other embodiments, the VPN functionality may be implemented differently. For example, in some embodiments where the communications processing unit is implemented with a programmable hardware element, such as an FPGA, the VPN functionality may be implemented in hardware, e.g., may be implemented as part of the hardware configuration, e.g., via a netlist, e.g., generated based on software. More generally, the communications processing unit may implement integrated VPN functionality (referred to generally as VPN software) via any means desired.

In other words, the communications processing unit may be configured to interface with the network, and may execute virtual private network (VPN) software (or may otherwise implement VPN functionality), or other networking software. Thus, the communications processing unit may provide for network communications with the host computer or VM, and in some embodiments, may include integrated secure network connectivity functionality via the VPN software (or other implementation). Such network security functionality being integrated directly into the zero client device may provide cost savings for users, and further, may preemptively prevent security problems that could arise due to ignorance or naïveté on the part of the client user.

The communications processing unit may be configured to determine an identifier of a server to which connection is desired. In one embodiment, the transcoding processing unit may be configured to instruct the communications processing unit to instantiate a VPN session with the server. The communications processing unit may be configured to instantiate the VPN session with the server via the VPN software in response to the instruction from the transcoding processing unit. The VPN session may enable communications between components or devices connected to the communications processing unit and any systems or networks to which the server provides access.

The transcoding processing unit may be configured to instantiate a zero client session with the server via the VPN session. In other words, the transcoding processing unit may utilize the established VPN session to instantiate the zero client session.

In some embodiments, the transcoding processing unit may be further configured to receive input data from one or more human interface devices, encode the input data, and provide the encoded input data to the communications processing unit for transmission over the network to the server via the zero client session. Accordingly, the communications processing unit may be configured to receive the encoded input data from the transcoding processing unit, transmit the encoded input data over the network to the server via the zero client session, receive output data from the server over the network via the zero client session, and send the output data to the transcoding processing unit. The transcoding processing unit may be further configured to receive the output data from the communications processing unit, decode the output data, and send the decoded output data to at least one of the one or more human interface devices.

Thus, as FIG. 1 indicates, the zero client device may receive user interface signals or commands via the HIDs, e.g., keyboard, mouse, microphone, touch-screen or pad, etc., which the transcoding processing unit may encode for transmission to the host computer or VM via the communications processing unit. Conversely, as noted above, the client may receive signals (e.g., data) from the host over the network via the communications processing unit. These signals may have been encoded by the host for transmission over the network, and the transcoding processing unit may decode these signals and provide the decoded signals to one or more interface devices as appropriate, e.g., a display or monitor, speakers, and so forth. As also noted above, the signals that the client may receive and decode may include video signals for display on the display or monitor, and audio signals for presentation by speaker(s). Moreover, as also mentioned above, in some embodiments, the client may also be configured to receive and decode additional signals, such as a USB (Universal Serial Bus) or peripheral bus signal. Thus, for example, additional devices may be coupled to the client for provision of further functionality, e.g., scanners, cameras, bar code readers, and so forth, as desired.

It is important to note that the novel embodiments contemplated and disclosed above are not limited simply to the integration of a VPN device with a zero client device within a single housing. As noted above, an important novel aspect of embodiments of the present system and method is the integration of connection functionalities into a unified software connection interface of the system (zero client device), such that when a user initiates a connection to a remote host, the VPN is automatically instantiated and connected, after which the actual zero client connection may take place (i.e., the zero client connection between the transcoding processing unit and the remote host). This is significant because without the instantiation of the VPN connection, the remote system to which the zero client communications processing unit is attempting to connect may not even be visible on the network by virtue of being behind a firewall. In other words, it is only the automatic instantiation of the VPN connection via the unified connection interface disclosed herein that configures the VPN connection appropriately prior to the zero client transcoding processing unit attempting to establish a connection.

In one exemplary embodiment, the technique may be implemented as follows:

The zero client device (which includes integrated VPN software running or implemented on the communications processing unit) may present a user interface which queries or prompts the user for his/her login credentials, or alternatively, the name of a remote system to which a connection is desired.

If the user provides login credentials, the interface, running on the zero client transcoding processing unit (or communications processing unit), may contact a connection broker to obtain the IP address or hostname of the remote system to connect to. If the user provides the IP address or the hostname of the remote system, this information may be used directly to establish the connection. Alternatively, the IP address or hostname may be retrieved from a configuration file.

It should be noted that in various embodiments, the acquisition of the IP address or the hostname of the remote system may be performed by either or both of the communications processing unit and the transcoding processing unit. For example, either (or both) of these units may execute software (or have configured hardware) that presents a graphical user interface (GUI) to the user via which the user can provide the IP address or hostname, or via which the user may invoke retrieval from another source, e.g., a broker or configuration file. Similarly, either (or both) of the units may execute software (or have configured hardware) that retrieves this information, e.g., from a broker or configuration file.

According to one embodiment, once the IP address or the hostname of the remote system has been acquired via the user, a connection broker, or a configuration file, the software (running on the zero client transcoding processing unit and/or the communications processing unit) may communicate with the VPN software (executing on the communications processing unit), e.g., over a an internal network, e.g., an RJ-45 network in the zero client device. In one embodiment, a small software agent running on the communications processing unit may listen for such communications. The message sent from the software running (or otherwise implemented) on the zero client transcoding processing unit may indicate to the software agent running on the communications processing unit that it should invoke a VPN session with a pre-configured host, e.g., which may also be referred to as a VPN concentrator.

In the event that a pre-configured VPN host is not available, the software running on the zero client transcoding processing unit (or the communications processing unit) may alternatively provide to the software agent running on the communications processing unit (hosting the VPN software) the name of the VPN host to connect to.

Once the name or IP address of the VPN host has been obtained, the agent running on the communications processing unit may instantiate a VPN connection. This VPN connection may allow all devices connected to the communications processing unit, such as, for example, the transcoding processing unit, to obtain network visibility to all systems and network(s) to which the VPN host provides access.

Once such network visibility is obtained, the software running on the zero client transcoding processing unit may instruct the communications processing unit to instantiate a zero client connection (remoting protocol connection) to the specified host.

The novel combination of components (including software) and the software-enabled workflow described above thus allows an end user of the zero client to simply provide credentials or a remote hostname, which may result in the underlying triggering of a set of processes which (optionally) retrieves the hostname from a connection broker, instantiates a VPN connection to a pre-configured host or to a host explicitly specified by the end-user, and subsequently instantiates a zero client session with the selected remote host without any further user involvement.

The following describes various further exemplary embodiments of the zero client device.

In one embodiment, the communications processing unit may be configured to forward a copy of all data associated with the VPN session to a secondary remote server whose address is pre-configured by the user in configuration settings of the communications processing unit.

In a further embodiment, the communications processing unit may be further configured to execute Wide Area Network (WAN) optimization software to optimize remote communications in the VPN session.

In one embodiment, the communications processing unit may be configured to report on the usage and connection statistics associated with the VPN session to a secondary remote server whose address is pre-configured by the user in configuration settings of the communications processing unit. For example, the usage and connection statistics may include one or more of: whether and when the zero client device is connected or not, data transmission rates, data transmission amounts, time of connection, or connection destination, among others.

Figure 2:
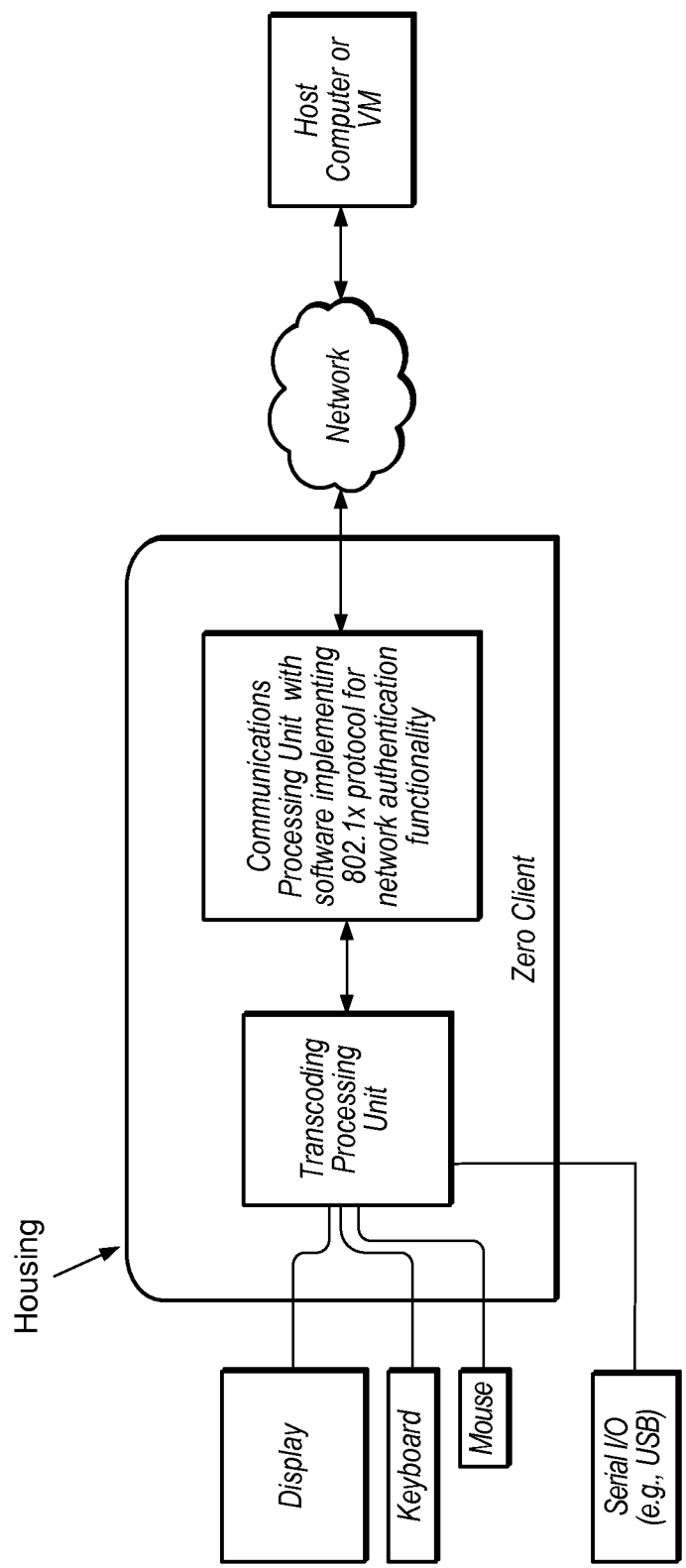
FIG. 2 illustrates integration of network authentication capability into a zero client device, according to one embodiment.

FIG. 2—Integration of Network Authentication Capability into a Zero Client Device FIG. 2 illustrates integration of network authentication (e.g., 802.1x) capability into a zero client device, according to one embodiment. As noted above, the communications processing unit of the client system may implement network communications functionality. In one embodiment, the communications processing unit may implement an 802.1x communications protocol in software, as indicated in FIG. 2. Note that in FIG. 2 and others of the Figures, elements in common with previously described embodiments, e.g., the embodiments of FIG. 1, and described with respect to those embodiments, may not be described unless further detail is provided for brevity, e.g., the display, keyboard, mouse, and serial I/O, etc.

IEEE 802.1x is an IEEE standard for port-based network access control. Part of the IEEE 802.1 set of networking protocols, 802.1x provides an authentication mechanism for devices requiring connection to a network, such as a LAN (Local Area Network) or a WLAN (wireless LAN), possibly over a WAN, such as the Internet. Thus, in some embodiments, the communications processing unit may provide network communications functionality with authentication for the zero client system.

More specifically, as FIG. 2 shows, in one exemplary embodiment, the zero client device may include a housing, a transcoding processing unit, included in the housing, and a communications processing unit, included in the housing and coupled to the transcoding processing unit, where the communications processing unit includes software implementing an 802.1x protocol for network authentication functionality. The zero client device may have no user-modifiable storage medium.

The communications processing unit may be configured to connect to a network using the 802.1x protocol, determine an identifier of a server to which connection is desired, and provide a network communication channel to the transcoding processing unit for accessing the server.

The transcoding processing unit may be configured to instantiate the zero client session with the server through the network communication channel provided by the communications processing unit, then receive input data from one or more human interface devices, encode the input data, and provide the encoded input data to the communications processing unit for transmission over the network to the server via the zero client session.

The communications processing unit may be further configured to receive the encoded input data from the transcoding processing unit, transmit the encoded input data over the network to the server via the zero client session, receive output data from the server over the network via the zero client session, and send the output data to the transcoding processing unit, which may be further configured to receive the output data from the communications processing unit, decode the output data, and send the decoded output data to at least one of the one or more human interface devices.

In another exemplary embodiment, the communications processing unit may be configured to execute both VPN software and 802.1x authentication software to provide network communication and authentication capabilities. Thus, for example, the communications processing unit may further include VPN software for securely connecting to the server over the network, and may be configured to instantiate a VPN session with the server via the VPN software, where the VPN session enables communications between components or devices connected to the communications processing unit and any systems or networks to which the server provides access.

It should be noted, however, that in other embodiments, the communications processing unit of the client system may implement other types of network communication and/or authentication protocols, as desired.

In some embodiments, communications over the network communication channel may be encrypted and/or compressed. Any encryption or data compression schemes may be used as desired. In one embodiment, the communications processing unit may be further configured to execute Wide Area Network (WAN) optimization software to optimize remote communications over the network communication channel.

As noted above, the novel utility of the present approach is due not only to the particular combination of components used (i.e., devices and software, including, for example, VPN, 802.1x components), but also to the software-implemented workflow, described above, which in one embodiment presents a single login screen to the end user and then triggers a set of workflows which a) causes the VPN connection to be instantiated, b) uses the provided credentials for 802.1x authentication, and c) upon the successful automated instantiation of a VPN connection and the completion of 802.1x authentication, invokes a zero client session with a specified host.

Figure 3:
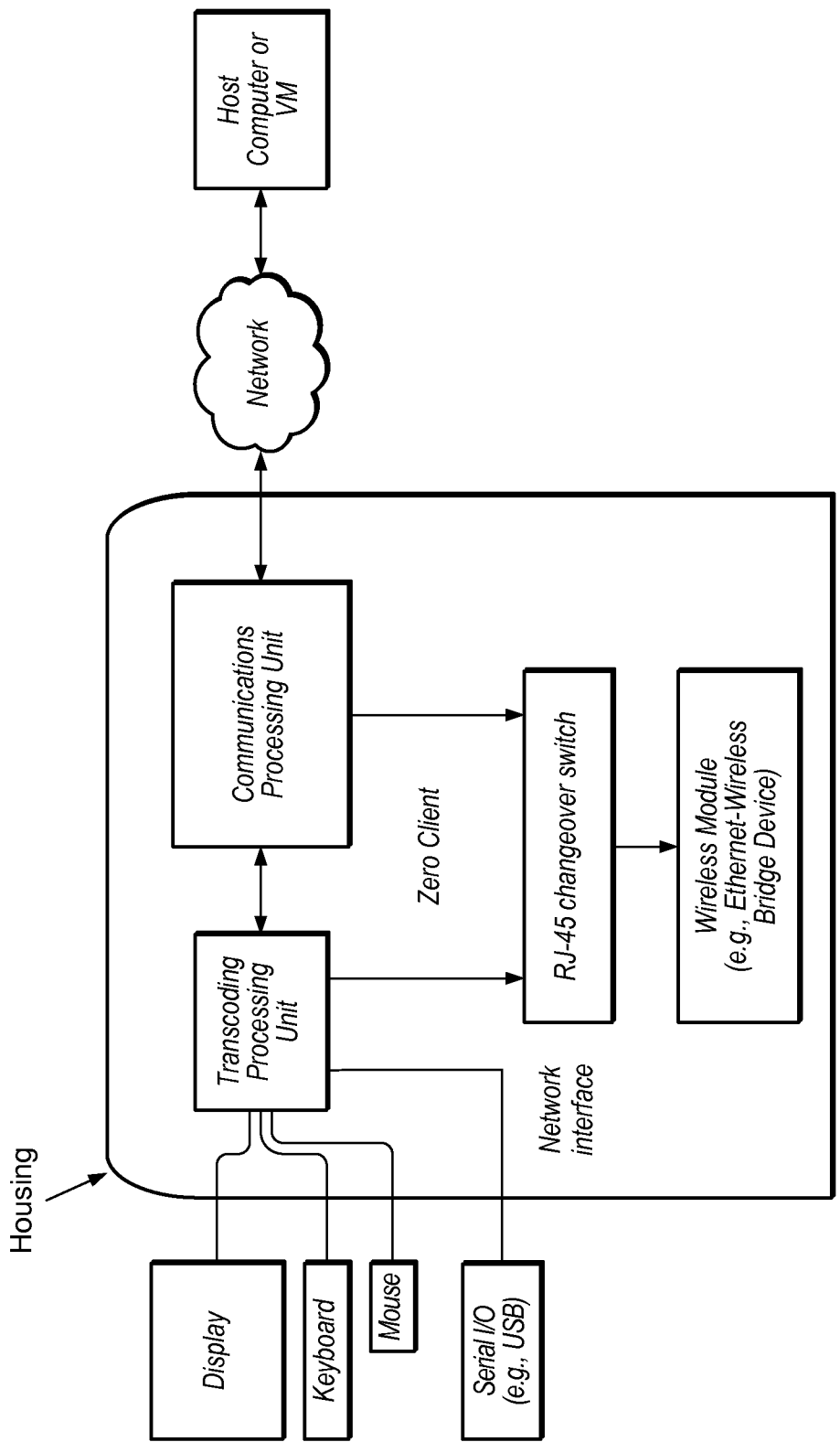
FIG. 3 illustrates integration of wireless capability into a zero client device, according to one embodiment.

FIG. 3—Integration of Wireless Capability into a Zero Client Device

In some of the embodiments described above, the zero client system (device) may be coupled to a network via wired means. For example, the ASIC or FPGA (or processor) of the zero client device or system may have a wired network interface. However, in some embodiments, wireless capability may be integrated into the client. An exemplary embodiment of such a system is illustrated in FIG. 3.

As may be seen, the system of FIG. 3 is somewhat similar to that of FIG. 1, where the (zero) client couples to various human interface devices, e.g., display/monitor, keyboard, mouse, serial I/O (i.e., serial device(s)), etc., and further couples to a host computer or VM over a network. Also common with embodiments of FIG. 1, the zero client device or system of FIG. 3 may include a housing, and a transcoding processing unit, included in the housing and implemented on a first circuit board. Note that the first circuit board does not implement wireless communication functionality. The zero client device or system may also include a communications processing unit, included in the housing, implemented on a second circuit board, and coupled to the transcoding processing unit.

Now, in the embodiment of FIG. 3 the zero client device may also include a wireless communications module, included in the housing and switchably coupled to the transcoding processing unit and the communications processing unit. Note that, being a zero client device, the zero client device does not include a user-modifiable storage medium.

In some embodiments, the communications processing unit may be configured to receive an identifier for a wireless network to which connection is desired, configure the wireless communications module to connect to the wireless network, and switch the wireless communications module to connect to the transcoding processing unit. The transcoding processing unit may in turn be configured to receive an identifier for a server accessible via the wireless network, and instantiate a zero client session with the server over the wireless network. The transcoding processing unit may be further configured to receive input data from one or more human interface devices, encode the input data, and provide the encoded input data to the communications processing unit for transmission over the wireless network to the server via the zero client session.

The wireless communication module may be configured to receive the encoded input data from the transcoding processing unit, and transmit the encoded input data over the wireless network to the server via the zero client session. Moreover, the wireless communication module may be further configured to receive output data from the server over the wireless network via the zero client session, and send the output data to the transcoding processing unit.

Accordingly, the transcoding processing unit may be further configured to receive the output data from the wireless communications module, decode the output data, and send the decoded output data to at least one of the one or more human interface devices. Thus, the zero client device may facilitate or implement communications with a server via wireless means.

In the exemplary embodiment shown, the wireless module is or includes an Ethernet-Wireless bridge device which typically has an RJ-45 connection and implements DHCP/gateway/wireless client capabilities so that a device paired with the bridge device via its wired LAN (RJ-45) connection can obtain an IP address and connect to the wireless network to which the bridge is connected.

However, note that in order to use such a bridge device, which is typically made for media or gaming applications (e.g., connecting a Sony PlayStation 2™ (PS2) game console wirelessly), appropriate wireless network settings must be configured. These bridge devices have typically required a computer system with a browser to connect to their wired RJ-45 port and access their configuration interface via a web browser. It may be inconvenient, and in many instances, impossible, for each zero client to be configured in such a laborious way, i.e., requiring a computer system (such as a personal computer or workstation) to first connect to it, and then to configure it.

However, via embodiments of the system shown in FIG. 3, the user may be allowed to simply and easily configure the wireless module, e.g., the wireless bridge, without requiring any additional computer equipment. In one embodiment, this may be accomplished by means of an RJ-45 changeover switch (or functional equivalents) which can optionally and momentarily connect the communications processing unit with the wireless bridge device. When this connection occurs, the communications processing unit may obtain an IP address from the wireless bridge and communicate with the bridge via IP.

The communications processing unit (or alternatively, the transcoding processing unit) may execute an embedded browser and may be configured to display a user interface on the display/monitor attached to the client. The user may then provide configuration parameters via this user interface (displayed on the monitor), which may then be obtained by the communications processing unit, which may commit them to the wireless bridge, thereby configuring the bridge. The RJ-45 changeover switch may then be switched back to the transcoding processing unit, e.g., the FPGA/decode-processor/ASIC. With the newly configured wireless parameters, the bridge may then be able to establish a wireless connection and the transcoding processing unit may simply operate as if it were connected to a wired network.

Alternatively, in another embodiment, Wi-Fi (wireless) settings may be configured by means of a script executing on the communications processing unit (or the transcoding processing unit), which may automate the configuration process described above. Wi-Fi devices are often configured via an HTML based configuration web page, where a human user accesses the page with a browser and manually configures the device. Typically, HTML based configuration web pages of Wi-FI devices do not expose an API with which a script or program can interface, as most HTML based configuration web pages are designed for manual human interaction.

In contrast, in some embodiments of the present device and techniques, HTML screen scraping techniques may be used to automatically login to an HTML web configuration page and populate appropriate HTML form fields to advance or implement the workflow(s) in the configuration page until the goal of the modification of the Wi-Fi settings has been achieved. Thus, in some embodiments, instead of interactively obtaining the input (specifying the Wi-Fi settings or parameters) from a human user, the communications processing unit may obtain the input from a remote network source, such as a management server that dispenses configuration information to multiple clients, or a wireless smart-phone (or other mobile networked device) running a configuration interface used by a system administrator on the road, or any other configuration parameter source(s).

In other embodiments, the wireless bridge may comprise a cellular device, e.g., a a 3G or 4G cellular data device. There are numerous ways this functionality may be implemented. For example, in one exemplary embodiment, the device may provide native RJ-45 port to bridge wireless access to a connected device. Alternatively, the device may be or include a USB/PCI or other plugin that requires a driver and network stack running on a processor in order to function. In embodiments where the device is a USB/PCI or other non-standalone device, such a cellular peripheral may be integrated with either the communications processing unit, or a secondary processor (or more generically, a secondary processing unit) which runs a network stack inclusive of the cellular peripheral driver, a DHCP server, gateway software and a full TCP/IP stack.

In one embodiment, the wireless communications module may further include Virtual Private Network (VPN) software (or other implementation) for securely connecting to the server over the wireless network. Accordingly, the wireless communications module may be further configured to instantiate a VPN session with the server via the VPN software, where the VPN session enables communications between components or devices connected to the communications processing unit and any systems or networks to which the server provides access.

In some embodiments, the wireless communications module may include multiple wireless transponders that implement channel bonding or link aggregation to increase available throughput.

In one embodiment, the communications processing unit is configured to maintain a white list of allowed wireless access points or networks with which the wireless communications module may connect. The communications processing unit may be further configured to disable or disconnect the wireless module in response to determining that the wireless communications module has attempted to establish a connection with a disallowed access point or network.

There are a variety of ways the zero client device can acquire the wireless network and server identifiers. For example, in one embodiment, the communications processing unit may be configured to receive user input indicating the identifier for the wireless network via a browser executing on the communications processing unit. In another embodiment, the communications processing unit may be configured to retrieve the identifier for the wireless network from a configuration file or even a remote configuration server (or other remote device). In a further embodiment, the communications processing unit may be configured to search or otherwise perform a discovery process to determine accessible wireless networks, and to select the wireless network based on specified criteria.

In some embodiments, to receive an identifier for a server, the transcoding processing unit may be configured to obtain the identifier for the server from a remote source via the wireless network, e.g., via a cellular device, or from a configuration server, among others.

Thus, in some embodiments, the client system may support wireless connectivity, and may also provide a ready means for configuring this connectivity without recourse to a separate computing system.

Figure 4:
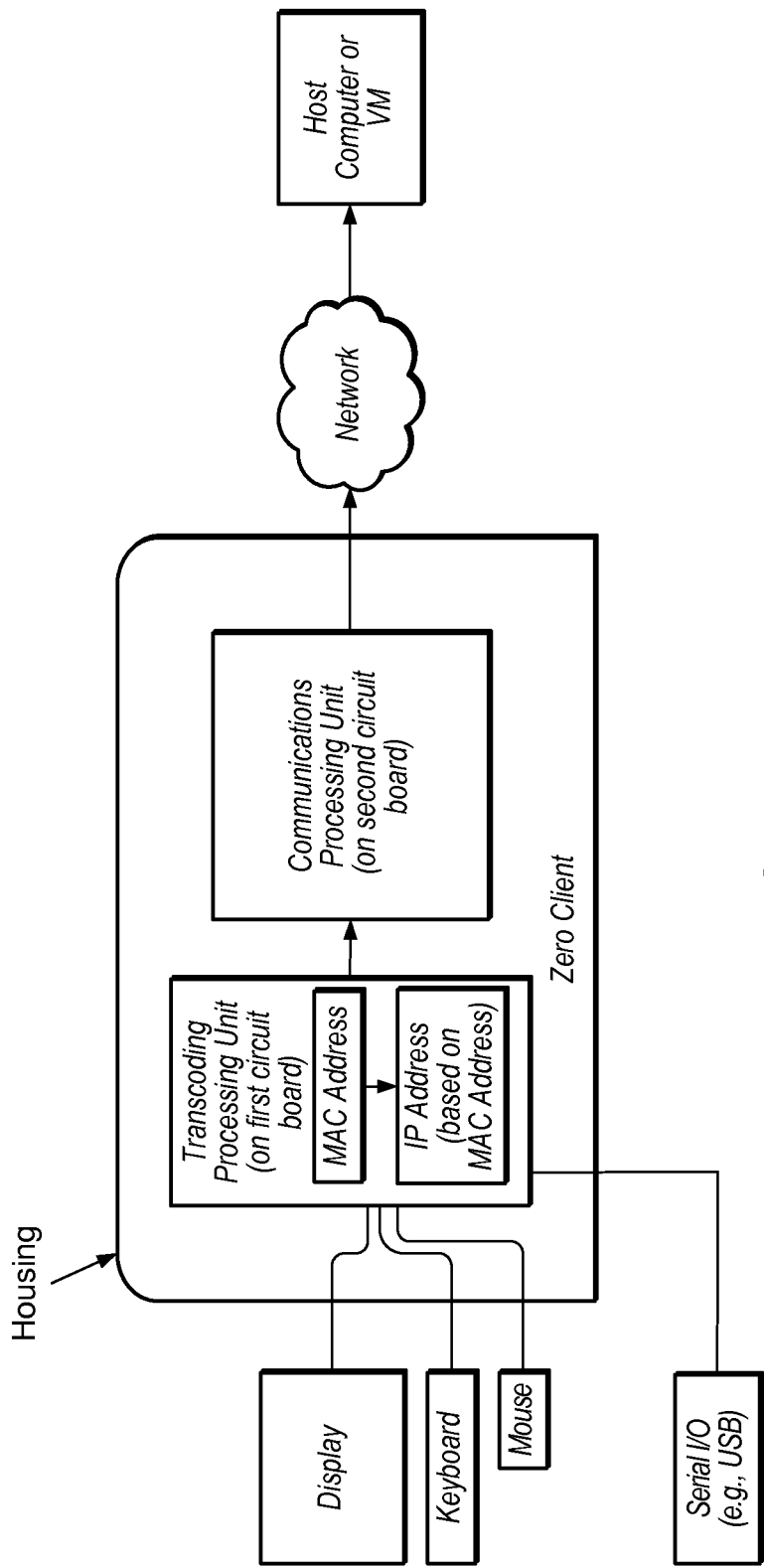
FIG. 4 illustrates assignment of an IP address to a zero client device based on a MAC address, according to one embodiment.

FIG. 4—Assignment of Unique IP Address to a Zero Client Device Based on MAC Address FIG. 4 illustrates assignment of an IP address to a zero client device based on a MAC address, according to one embodiment.

In various embodiments, different schemes may be implemented to assign a network address to the zero client system, e.g., an IP address, as desired. Standard approaches to address assignment include the standard DHCP address assignment methodology, and the alternative fixed IP assignment methodology. One or both of these standard approaches may be modified to provide unique benefits to the client system.

In one embodiment, a specific IP address may be assigned to the transcoding processing unit based on its MAC (Media Access Control) address. An advantage of this scheme is that it allows for unique IP addresses across distributed environments, as MAC addresses for each device are unique. A benefit of having such unique IP addresses across distributed environments is that when the client establishes a VPN or secure tunnel connection back to a resource center, e.g., a cloud, server farm, datacenter, etc., each client is guaranteed to have a unique IP address.

The IP addresses assigned can be associated with a MAC address and never changed, i.e., the IP address may be statically bound to the transcoding processing unit, or, alternatively, may be dynamically bound to the transcoding processing unit based on a MAC address to IP address binding obtained from a set of MAC address to IP address bindings stored on one or more server computers, e.g., may be obtained from a list maintained on a centralized server (or servers) which provides MAC address to IP bindings. Thus, the assigned addresses may be permanent or dynamic.

As shown in FIG. 4, in one exemplary embodiment, the zero client device may include a housing, and a transcoding processing unit, included in the housing and implemented on a first circuit board. The transcoding processing unit may include (e.g., store) a Media Access Control (MAC) address, and an Internet Protocol (IP) address based on the MAC address, where the IP address is useable by the transcoding processing unit to communicate with devices over networks. The zero client device may also include a communications processing unit, included in the housing, implemented on a second circuit board, and coupled to the transcoding processing unit. As noted above, the zero client device may have no user-modifiable storage medium.

In some embodiments, the communications processing unit may be configured to determine an identifier of a server to which connection is desired, and query a remote database against the MAC address of the coupled transcoding processing unit. The communications processing unit may be configured to obtain an IP address to assign to the transcoding processing unit from the remote database based on the MAC address, and assign the obtained IP address to the transcoding processing unit by: acting as a DHCP (Dynamic Host Control Protocol) server, or using a management application programming interface (API) of the transcoding processing unit to set its static IP address to the obtained IP address. The communications processing unit may be further configured to provide a network communication channel to the transcoding processing unit for accessing the server.

Accordingly, the transcoding processing unit may be configured to instantiate the zero client session with the server through the network communication channel provided by the communications processing unit. Moreover, the transcoding processing unit may be further configured to receive input data from one or more human interface devices, encode the input data, and provide the encoded input data to the communications processing unit for transmission over the network to the server via the zero client session.

The communications processing unit may be configured to receive the encoded input data from the transcoding processing unit, transmit the encoded input data over the network to the server via the zero client session, receive output data from the server over the network via the zero client session, and send the output data to the transcoding processing unit. Accordingly, the transcoding processing unit may be further configured to receive the output data from the communications processing unit, decode the output data, and send the decoded output data to at least one of the one or more human interface devices.

In some embodiments, the communications processing unit may include Virtual Private Network (VPN) software for securely connecting to the server over the network, and may be further configured to instantiate a VPN session with the server via the VPN software. The VPN session may enable communications between components or devices connected to the communications processing unit and any systems or networks to which the server provides access.

Thus, embodiments of the above zero client device may utilize a MAC address to communicate with a server over a network.

Figure 5:
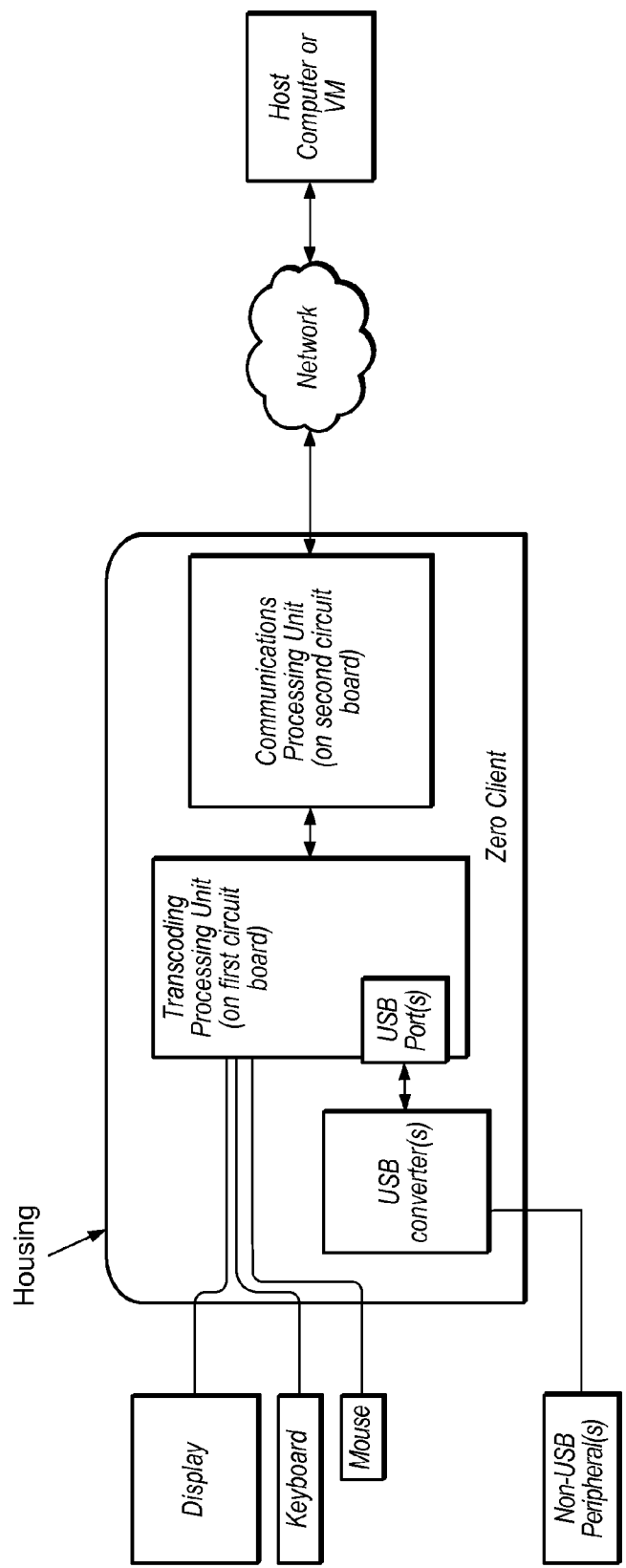
FIG. 5 illustrates integration of one or more serial or parallel ports into a zero client device, according to one embodiment.

FIG. 5—Integration of One or More Serial or Parallel Ports into a Zero Client Device FIG. 5 illustrates integration of one or more serial or parallel ports into a zero client device, according to one embodiment.

In some embodiments, the zero client device's transcoding processing unit supports peripheral remoting via a single, e.g., serial, communication protocol, e.g., the USB protocol only, and thus may only provide a port (or ports) for that protocol, e.g., one or more USB ports. In other embodiments, as indicated in FIG. 5, one or more converters may be integrated into the client's housing to convert between this (e.g., serial) protocol and other protocols, where the converters may be coupled to the one or more USB ports of the transcoding processing unit. For example, the one or more converters may be or include USB converters for converting between USB and RS-232 or RS-485 communication protocols, between USB protocol and a parallel communication protocol, or any other type of protocol converter. Moreover, in some embodiments, multiple converters may be utilized, and thus, combinations of converters may be used to support client system communications with a wide variety of peripherals and protocols.

In one embodiment, the transcoding processing unit may be connected to the one or more protocol converters via a secondary or auxiliary communication channel that may be used to implement one or more of a) power management for the one or more converters, b) gathering performance metrics from the one or more converters, and/or c) management and configuration of the one or more converters.

In one particular exemplary embodiment, represented in FIG. 5, the zero client device may include a housing, and a transcoding processing unit included in the housing and implemented on a first circuit board, where the transcoding processing unit includes at least one USB port. The zero client device may further include one or more converters included in the housing and coupled to the USB port of the transcoding processing unit to facilitate communications between the transcoding processing unit and a corresponding one or more non-USB peripheral devices. Each converter of the one or more converters may be configured to convert between USB protocol and a respective one of an RS-232 communication protocol, an RS-485 communication protocol, or a parallel communication protocol, among others. As FIG. 5 shows the transcoding processing unit may also be configured to couple to one or more human interface devices, e.g., a display, keyboard, mouse, etc., as desired.

The zero client device may further include a communications processing unit, included in the housing, implemented on a second circuit board, and coupled to the transcoding processing unit. The zero client device may have no user-modifiable storage medium.

The communications processing unit may be configured to determine an identifier of a server to which connection is desired, and provide a network communication channel to the transcoding processing unit for accessing the server. The transcoding processing unit may be configured to instantiate a zero client session with the server through the network communication channel provided by the communications processing unit, then receive first input data from one or more human interface devices, receive second input data from at least one non-USB peripheral device via at least one of the one or more converters, encode the first and second input data, thereby generating encoded input data, and provide the encoded input data to the communications processing unit for transmission over the network to the server via the zero client session.

Now, the communications processing unit may be configured to receive the encoded input data from the transcoding processing unit, and transmit the encoded input data over the network to the server via the zero client session.

Conversely, the communications processing unit may be further configured to receive first and second output data from the server over the network via the zero client session, and send the first and second output data to the transcoding processing unit, which may be further configured to receive the first and second output data from the communications processing unit, decode the first and second output data, thereby generating corresponding first and second decoded data. The transcoding processing unit may be further configured to send the first decoded output data to at least one of the one or more human interface devices, and send the second decoded data to the at least one non-USB peripheral device via at least one of the one or more converters.

In some embodiments, the communications processing unit may include Virtual Private Network (VPN) software for securely connecting to the server over the network, and may be further configured to instantiate a VPN session with the server via the VPN software. The VPN session may enable communications between components or devices connected to the communications processing unit and any systems or networks to which the server provides access.

In some embodiments, communications over the network communication channel may be encrypted and/or compressed. Any encryption or data compression schemes may be used as desired. In one embodiment, the communications processing unit may be further configured to execute Wide Area Network (WAN) optimization software to optimize remote communications over the network communication channel.

In a further embodiment, the communications processing unit may be further configured to identify packets transmitted over the network communication channel that are associated with a specified converter. In other words, the communications processing unit may be able to determine which converters are associated with which communication packets. The communications processing unit may then present various options to the user that take advantage of this functionality. For example, in some embodiments, the communications processing unit may be configured to, in response to user input, log communications related to the specified converter, forward communications related to the specified converter to a remote server whose address has been user configured in configuration settings of the communications processing unit, prevent forwarding of packets over the network communication channel related to the specified converter, or accelerate or prioritize transmission of packets on the out-of-band USB session, related to the specified converter, among other actions.

Figure 6:
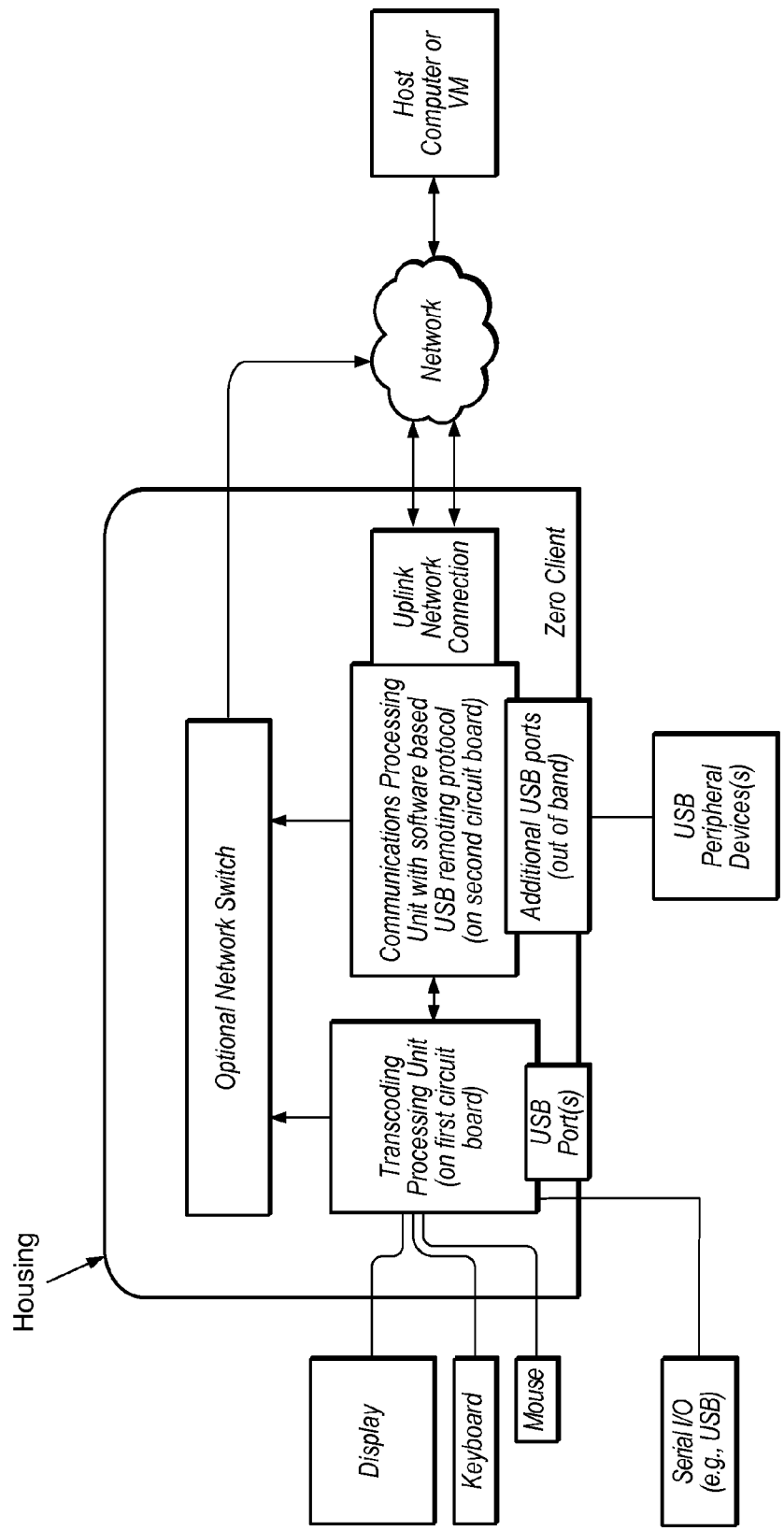
FIG. 6 illustrates USB bandwidth augmentation and support for out-of-band capabilities in a zero client device, according to one embodiment.

FIG. 6—USB Bandwidth Augmentation and Support for Out-of-Band USB Capabilities in a Zero Client Device As discussed above, in some embodiments, the zero client device may have a single network interface by which it may connect to the network. This interface may be configured to deliver display (video), audio, and keyboard/mouse input/output, as well as all peripheral traffic, by means of a single protocol, e.g., the TCP/IP protocol. In some embodiments, an out-of-band technique may be utilized to enhance USB throughput capabilities delivered by a client. In some embodiments, the zero client device may include one or more additional USB ports (or ports supporting other protocols) which are out-of-band, where "out-of-band" means that the communications occur outside the normal zero client session for the device. Moreover, a software based USB remoting protocol may be used to implement a software USB redirection channel.

FIG. 6 illustrates an exemplary embodiment of a zero client system or device with USB bandwidth augmentation and support for out-of-band capabilities, e.g., out-of-band USB functionality, e.g., including USB 2.0 and/or USB 3.0 based functionality. It should be noted that while various of the features described herein are presented in terms of the USB communication protocol, in other embodiments any other serial bus protocol(s) may be used as desired.

As may be seen, in the embodiment shown, the transcoding processing unit, which may be implemented on a first circuit board, may include at least one USB port and may support peripheral remoting via USB protocol.

The zero client's communications processing unit, which may be implemented on a second circuit board, and which is coupled to the transcoding processing unit, may be configured to implement (execute) a software based USB remoting protocol that supplements the at least one USB port of the transcoding processing unit. To supplement the at least one USB port of the transcoding processing unit, the communications processing unit may implement one or more USB ports for out-of-band communications implementing a supplemental peripheral communication channel.

The zero client device may further include an uplink network connection, also included in the housing, and included in or coupled to the communications processing unit for connecting to a network.

The communications processing unit may be configured to determine an identifier of a server to which connection is desired (e.g., a remote host computer, a remote virtual machine, or any other type of server), instantiate an out-of-band session with the server to provide for supplemental peripheral communication, and provide a network communication channel to the transcoding processing unit for accessing the server. More generally, the communications processing unit may ascertain connection information for connecting the zero client device to a resource over a network, and provide this information to the transcoding processing unit. The communications processing unit may be further configured to establish an out-of-band USB session for communications between the server and the communications processing unit, and between the server and peripheral devices connected to the one or more USB ports for out-of-band communications. In other words, an extra or auxiliary (out-of-band) USB (or other serial bus) session may be provided (established) for communications between the server and peripheral devices on the out-of-band USB ports via the communications processing unit.

The transcoding processing unit may be configured to instantiate a zero client session with the server through the network communication channel provided by the communications processing unit, after which the transcoding processing unit may (be operable to) receive first input data from one or more human interface devices, encode the input data, thereby generating encoded input data, and provide the encoded input data to the communications processing unit for transmission over the network to the server via the zero client session.

Accordingly, the communications processing unit may be configured to receive the encoded input data from the transcoding processing unit, and to receive second input data from one or more USB peripheral devices via the (additional) one or more USB ports. The communications processing unit may be further configured to transmit the encoded input data and the second input data over the network to the server via the zero client session.

The communications processing unit may be further configured to receive first output data from the server over the network via the zero client session, receive second output data from the server over the network via the out-of-band USB session, send the first output data to the transcoding processing unit, and send the second output data to the one or more USB peripheral devices via the one or more USB ports.

The transcoding processing unit may be further configured to receive the first output data from the communications processing unit, decode the first output data, thereby generating decoded output data, and send the decoded output data to at least one of the one or more human interface devices.

Thus, in the embodiment of FIG. 6, the communications processing unit is configured to execute USB remoting software which supplements the USB remoting capabilities of the transcoding processing unit. There are several novel techniques that may be used to implement this architecture.

For example, in one embodiment, the presence of additional USB ports may act as a supplemental peripheral communication channel (or channels) to the USB ports connected via the transcoding processing unit. As another example, USB remoting software may be integrated on the communications processing unit, which is paired with the transcoding processing unit implementing a zero (or cloud) client protocol. In some embodiments, this supplemental communication channel may be referred to as a software USB redirection (or auxiliary) channel.

In another embodiment, two uplink network connections may be provided on a single zero client device, where one connection is dedicated principally to peripheral communication (e.g., USB remoting), and the other for communication with the server or cloud. For example, the communications processing unit may include two uplink network connections, including a first uplink network connection (included in the housing) for in-band network communications for the transcoding processing unit, and a second uplink network connection (also included in the housing) for out-of-band network communications via the software based USB remoting protocol.

In a variation of the above two-uplink-based embodiment, an optional switch may be integrated that combines the two uplinks into a single uplink. This switch may be of any speed, but preferentially implements 1 Gbps or 10 Gbps (or higher) connectivity to allow for sufficient bandwidth to support peripheral traffic acceleration via the out-of-band channel described above.

In a further embodiment, USB 3.0 redirection may be implemented by integrating a USB 3.0 host controller with the communications processing unit, and allowing redirection to occur over the software USB redirection channel. Note that even if the zero client protocol and decode processing unit does not support USB 3.0, this technique may allow the end-user to utilize USB 3.0 devices at higher data rates.

In one embodiment, the zero client device may communicate with the server via a zero client protocol that does not support USB 3.0, and where the transcoding processing unit does not support USB 3.0. In this case, the communications processing unit may further include a USB 3.0 host controller that implements out-of-band redirection via the software based USB remoting protocol, thereby facilitating high-speed out-of-band communications with USB 3.0 compliant peripheral devices.

In yet another embodiment, a software stack may be executed on the communications processing unit, and may detect which remote host or VM the transcoding processing unit is connected to. Upon detection, the out-of-band USB session with the same host may be initiated using the USB redirection software running on the communications processing unit.

In some embodiments, the one or more ports for out-of-band communications may include one or more of: one or more audio ports or one or more video ports. In one exemplary embodiment, the one or more ports for out-of-band communications may include one or more Thunderbolt ports.

In one embodiment, the zero client device may communicate with the server via a zero client protocol that does not support Thunderbolt/LightPeak (i.e., LightPeak, or the Thunderbolt implementation of LightPeak), and where the transcoding processing unit does not support Thunderbolt/LightPeak. Accordingly, in some embodiments, the communications processing unit may further include a Thunderbolt/LightPeak host controller that implements out-of-band redirection via a software based Thunderbolt/LightPeak remoting protocol, thereby facilitating high-speed out-of-band communications with Thunderbolt/LightPeak compliant peripheral devices.

In another embodiment, the communications processing unit may include or be coupled to one or more converters configured to convert between USB protocol and a respective one or more other communication protocols. The one or more ports for out-of-band communications may support out-of-band communications using the respective one or more other communication protocols.

In one embodiment, the zero client device may further include a switch, also included in the housing, where the switch is included in or coupled to the communications processing unit, and is further coupled to the uplink network connection. The switch may be configured to switch between in-band network communications for the transcoding processing unit, and out-of-band network communications via the software based USB remoting protocol. The switch may also support sufficient bandwidth to support peripheral traffic acceleration via the supplemental peripheral communication channel.

In one embodiment, the communications processing unit may be further configured to execute a software stack to detect which server the zero client device is connected to, and upon detection, initiate the out-of-band USB session with the server via the software based USB remoting protocol.

In some embodiments, the communications processing unit may include Virtual Private Network (VPN) software for securely connecting to the server over the network, and may be further configured to instantiate a VPN session with the server via the VPN software. The VPN session may enable communications between components or devices connected to the communications processing unit and any systems or networks to which the server provides access.

In some embodiments, communications over the out-of-band USB session may be encrypted and/or compressed. Any encryption or data compression schemes may be used as desired. In one embodiment, the communications processing unit may be further configured to execute Wide Area Network (WAN) optimization software to optimize remote communications in the out-of-band USB session.

In a further embodiment, the communications processing unit may be further configured to identify packets associated with a specified USB device. In other words, the communications processing unit may be able to determine which USB devices are associated with which communication packets, e.g., as senders or receivers of the packets. The communications processing unit may then present various options to the user that take advantage of this functionality. For example, in some embodiments, the communications processing unit may be configured to, in response to user input, log communications related to the specified USB device, forward communications related to the specified USB device to a remote server whose address has been user configured in configuration settings of the communications processing unit, prevent forwarding of packets on the out-of-band USB session related to the specified USB device, or accelerate or prioritize transmission of packets on the out-of-band USB session, related to the specified USB device, among other actions.

Note that in various embodiments, any combination of the above features may be used as desired. More generally, any of the features described herein regarding any of the zero client device embodiments may be used in any combinations desired, as noted above.

Figure 7:
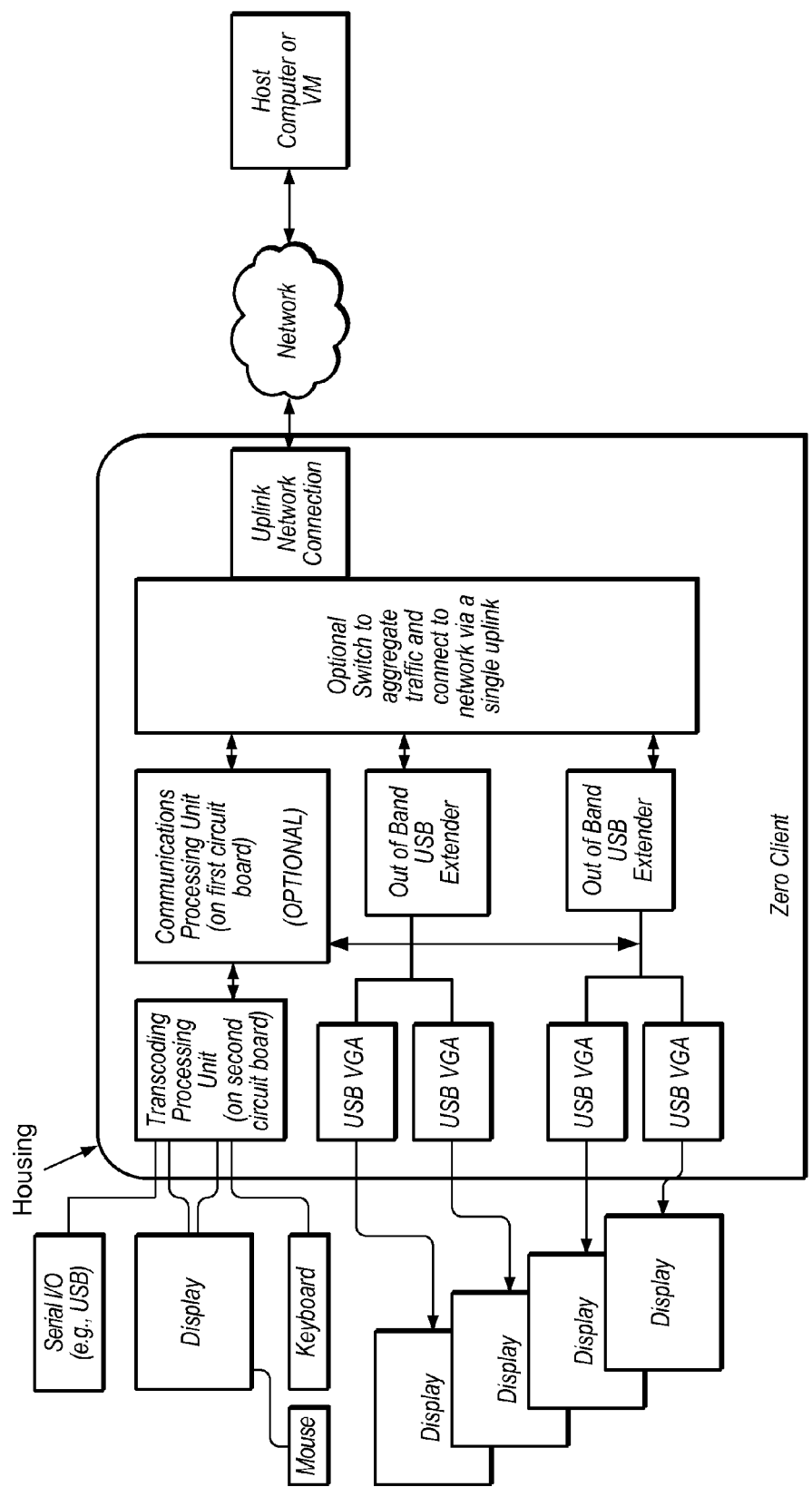
FIG. 7 illustrates integration of multiple display adaptors, remoting hardware, and I/O devices with a zero client device to extend display capabilities, according to one embodiment.

FIG. 7—Integration of Multiple USB-Based Display Adaptors, USB Remoting Hardware, and I/O Devices with a Zero Client to Extend Display Capabilities A zero (or cloud) client typically drives between 1 and 4 monitors. No solution presently available can drive more than 4 monitors from a single zero client. Thus, in some embodiments, multiple display (i.e., video) adaptors may be employed in or by the client system to provide a solution that may be scaled arbitrarily to drive a large number of monitors from a single client device.

FIG. 7 illustrates an exemplary embodiment of such a zero client system or device, where multiple display adaptors, remoting hardware, and I/O devices are integrated with a zero client device to extend display capabilities. As with the system of FIG. 6, the zero client device of FIG. 7 may include a housing, an uplink network connection comprised in the housing and configured for connecting to devices over a network, and an optional communications processing unit, included in the housing and coupled to the uplink network connection, where the communications processing unit is implemented on a first circuit board. The system (device) may also include a transcoding processing unit, included in the housing and coupled to the communications processing unit, where the transcoding processing unit is implemented on a second circuit board. Note that in this embodiment, the second circuit board does not include onboard USB-based display adaptors, and the transcoding processing unit is configured to drive a first display and communicate with one or more user interface devices via a zero client protocol. The zero client device may also include one or more out-of-band USB extenders (or other types of out-of-band serial extenders) coupled to the communications processing unit.

As FIG. 7 also shows, in this embodiment, the zero client system (device) may include one or more USB video adaptors (or other types of serial video adaptors), coupled to at least one of the one or more out-of-band USB extenders, where each USB video adaptor may be configured to drive a respective additional display. In other words, the system may include additional display adaptors, e.g., USB VGA adaptors per FIG. 7, each of which may drive one or more additional displays (monitors). Note that in the embodiment shown, these additional monitors are not driven by the transcoding processing unit. Rather, each video adaptor receives video or display signals from one of the above out-of-band USB extenders integrated into the zero client device. In this particular embodiment, each of two USB extenders supports two display adaptors, although in other embodiments, the ratio of out-of-band USB extenders to display adaptors may differ. Similarly, other protocols/extenders besides USB may be employed as desired. However, it should be noted that in other embodiments, the transcoding processing unit may be further configured to drive one or more additional displays.

It should be further noted that in various embodiments, the out-of-band USB extenders and/or the video adaptors may be implemented and/or coupled in any of a variety of ways. For example, in one embodiment, one or more of the out-of-band USB extenders and/or one or more of the video adaptors may be implemented on the first circuit board with the communications processing unit. In another embodiment, one or more of the out-of-band USB extenders and/or one or more of the video adaptors may be implemented on the same circuit board (but distinct from the first circuit board). Any other implementations may be utilized as desired. Note that in the embodiment of FIG. 7, the communications processing unit is communicatively coupled to both the out-of-band extenders and the video adaptors.

The following describes exemplary communications by the zero client device with a server via the communications and transcoding processing units.

In some embodiments, the communications processing unit may be configured to determine an identifier of a server to which connection is desired, instantiate a USB (or other serial protocol/bus) extension session between the one or more out-of-band USB extenders and the server, and provide a network communication channel to the transcoding processing unit for accessing the server. Accordingly, the transcoding processing unit may be configured to instantiate a zero client session with the server through the network communication channel provided by the communications processing unit. Note that the zero client session is distinct (different) from the USB extension session, although in some embodiments, both sessions may utilize the uplink network connection, e.g., the same physical network connection.

The transcoding processing unit may be further configured to receive input data from one or more human interface devices, encode the input data, and provide the encoded input data to the communications processing unit for transmission over the network to the server. The communications processing unit may be configured to receive the encoded input data from the transcoding processing unit, and transmit the encoded input data over the network to the server via the zero client session. Conversely, the communications processing unit may also be configured to receive output data from the server over the network via the zero client session, and send the output data to the transcoding processing unit. The transcoding processing unit may accordingly be further configured to receive the output data from the communications processing unit, decode the output data, and send the decoded output data to at least one of the one or more human interface devices.

Note that the one or more out-of-band USB extenders may be configured to provide video communications between the USB video adaptors and the server via the USB extension session through the communications processing unit. In other words, in addition to communicating with the server via the zero client session, the zero client device may further provide for out-of-band video communications with the server via the USB extenders, e.g., for extended or auxiliary display functionality.

In one embodiment, the communications processing unit may include Virtual Private Network (VPN) software for securely connecting to the server over the network, and may be further configured to instantiate a VPN session with the server via the VPN software, where the VPN session enables communications between components or devices connected to the communications processing unit and any systems or networks to which the server provides access.

In addition to the extra display adaptors and out-of-band USB extenders, the exemplary embodiment shown in FIG. 7 also includes an optional switch interposed between the optional communications processing unit (e.g., running VPN software) and the network. This switch may be configured to aggregate client data traffic and connect to the network via a single uplink, similar to that described above.

Thus, in one embodiment, the client system or device may comprise a combination of out-of-band USB extenders, USB VGA adaptors, an optional switch for IP uplink consolidation, an optional communications processing unit, and a transcoding processing unit responsible for decoding a zero (or cloud) client protocol.

In some embodiments, the communications processing unit may implement one or more ports for out-of-band communications, thereby implementing one or more supplemental peripheral communication channels. The one or more supplemental peripheral communication channels may be configured to provide USB remote redirection for USB peripherals coupled to the zero client device.

In one embodiment, software that runs on the communications processing unit may detect the IP address or hostname of the (remote) server (e.g., host) to which the transcoding processing unit is connecting, and may initiate a session between the out-of-band USB extenders and the server. Note that at least two types of USB extenders are contemplated: i) IP based (i.e., configured to communicate over the network via IP protocol), and ii) non-IP based, such as RJ-45 based, where the latter may require a homerun connection and may not traverse IP switches, routers, or hubs. Note that in embodiments using non-IP based extenders, the zero client device may include multiple RJ-45 ports respectively configured to provide respective homerun connections to the server.

As noted above, in some embodiments, the communications processing unit and/or the uplink switch may be omitted. Thus, for example, in one embodiment, the transcoding processing unit may include a network connection for communicating with a server over a network, and may provide USB ports with which devices can be attached, e.g., human interface devices such as keyboards or mice, and/or protocol conversion devices (converters) such as the USB/RS-232 converter described above.

In further embodiments, communications over the USB extension session may be encrypted and/or compressed, as desired.

Moreover, in some embodiments, the communications processing unit may be further configured to execute Wide Area Network (WAN) optimization software to optimize remote communications in the USB extension session.

In a further embodiment, the communications processing unit may be configured to identify packets associated with a specified USB video adapter. In other words, the communications processing unit may be able to determine which USB video adapter are associated with which communication packets, e.g., as senders or receivers of the packets. The communications processing unit may then present various options to the user that leverage this functionality. For example, in some embodiments, the communications processing unit may be configured to, in response to user input, log communications related to the specified USB video adapter, forward communications related to the specified USB video adapter to a remote server whose address has been user configured in configuration settings of the communications processing unit, prevent forwarding of packets on the out-of-band USB session related to the specified USB video adapter, or accelerate or prioritize transmission of packets on the out-of-band USB session, related to the specified USB video adapter, among other actions.

Figure 8:
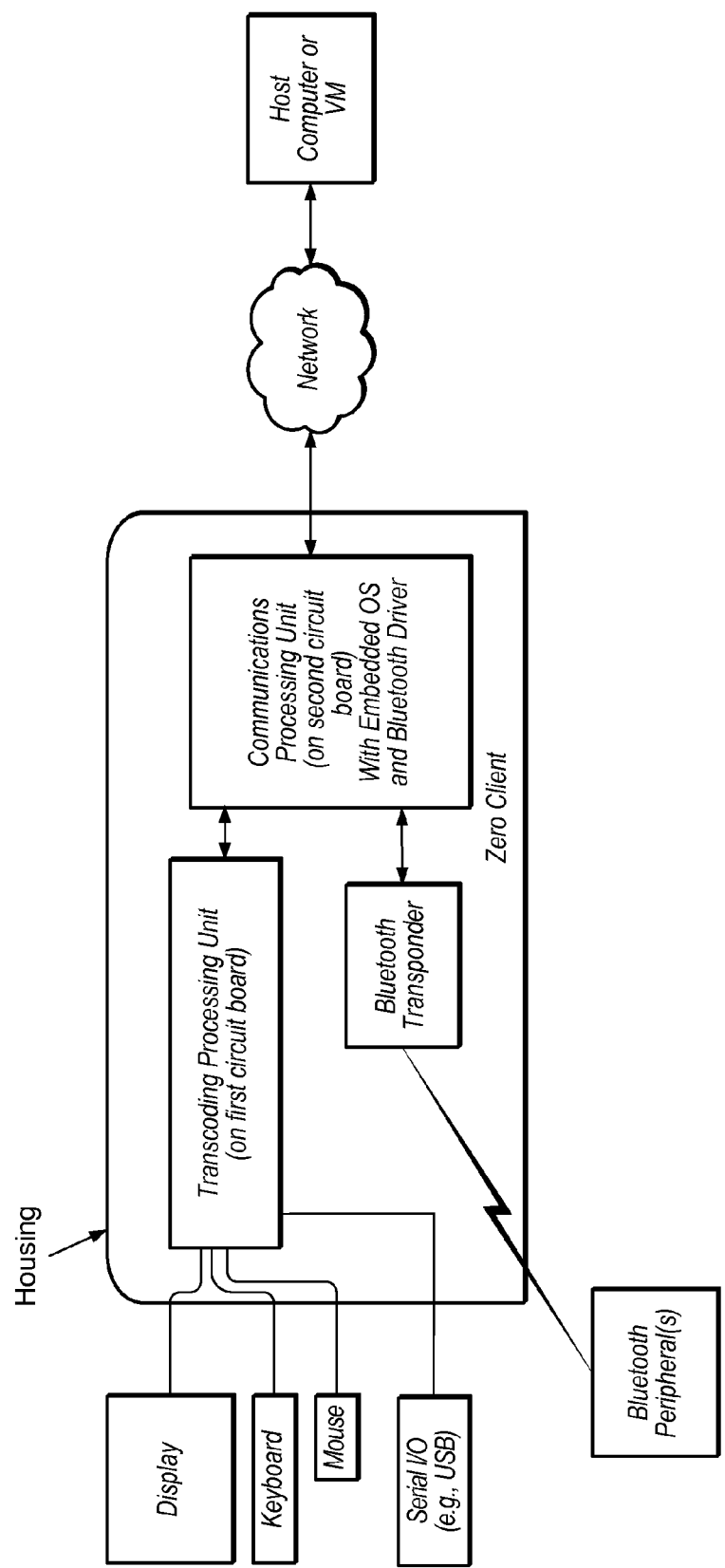
FIG. 8 illustrates integration of Bluetooth capability into a zero client device, according to one embodiment.

FIG. 8—Integration of Bluetooth Capability into a Zero Client

FIG. 8 illustrates integration of Bluetooth capability into a zero client device, according to one embodiment. In some embodiments, the zero client device may integrate Bluetooth capability to allow for Bluetooth peripherals, e.g., wireless keyboards, mice, among others, to interface with the client. As described above, a zero client transcoding processing unit does not have a conventional operating system (OS) and thus, may not utilize conventional device drivers. Thus, in some embodiments, a Bluetooth transponder may be connected to the communications processing unit, and the communications processing unit may be configured to run an embedded operating system. A device driver for the Bluetooth transponder may thus run on top of the OS residing on the communications processing unit, allowing the connection and enumeration of Bluetooth peripherals, e.g., a Bluetooth keyboard, mouse, or other peripheral, with the communications processing unit.

In one more specific exemplary embodiment, the zero client device may include a housing, a transcoding processing unit, included in the housing and implemented on a first circuit board, and a communications processing unit, also included in the housing, implemented on a second circuit board, and coupled to the transcoding processing unit. The communications processing unit may be configured to connect to servers over a network. The zero client device may further include a Bluetooth transponder, which is also included in the housing and coupled to the communications processing unit.

The communications processing unit may be configured to run an embedded operating system, and may be configured with a device driver for the Bluetooth transponder for communications between the Bluetooth transponder and the embedded operating system. The device driver may be executable to provide for connection and enumeration of Bluetooth peripheral devices. As with the above embodiments, the zero client device may have no user-modifiable storage medium.

The communications processing unit may be configured to determine an identifier of a server to which connection is desired, and provide a network communication channel to the transcoding processing unit for accessing the server, and the transcoding processing unit may be configured to instantiate the zero client session with the server through the network communication channel provided by the communications processing unit.

The transcoding processing unit may be further configured to receive first input data from one or more human interface devices, encode the first input data, thereby generating encoded input data, and provide the encoded input data to the communications processing unit for transmission over the network to the server via the zero client session.

The communications processing unit may be configured to receive the encoded input data from the transcoding processing unit, receive second input data from one or more Bluetooth peripheral devices via the Bluetooth transponder, and transmit the encoded input data and the second input data over the network to the server via the zero client session.

Conversely, the communications processing unit may be configured to receive first and second output data from the server over the network via the zero client session, send the first output data to the transcoding processing unit.

The transcoding processing unit may be further configured to receive the first output data from the communications processing unit, decode the first output data, thereby generating decoded output data, and send the decoded output data to the communications processing unit, which may be further configured to receive the decoded output data from the transcoding processing unit, and send the decoded output data to at least one of the one or more human interface devices. Moreover, the communications processing unit may be further configured to send the second output data to at least one of the one or more Bluetooth peripheral devices via the Bluetooth transponder.

Note, however, that keyboard/mouse (or other peripheral) input received from the communications processing unit may be required to be passed on to the transcoding processing unit. In order to achieve this, a keyboard/mouse/audio emulation device may be provided. Thus, in some embodiments, the zero client device may further include a microprocessor based keyboard/mouse/audio emulation device, included in the housing, and communicatively interposed between the communications processing unit and peripheral I/O ports of the transcoding processing unit. The emulation device may function as a communication bridge between the transcoding processing unit and the communications processing unit, and may be configured to receive the input data from the communications processing unit, generate input events corresponding to the input data, and provide the input events to the transcoding processing unit.

In other words, the emulation device may take output generated from the communications processing unit, and feed it directly into keyboard, mouse and audio ports of the transcoding processing unit running the zero client protocol. For example, if the "x" key is pressed on a Bluetooth keyboard, the Bluetooth transponder may receive the appropriate signal, e.g., custom software running on the communications processing unit may fetch the input from the keyboard buffer and transmit a signal to the connected keyboard/mouse/audio emulation device. The emulation device may be instructed to generate a key press event involving the "x" key. The emulation device accordingly generate a signal/key-press event, which may be picked up by the transcoding processing unit via the keyboard input port as if a real keyboard were connected.

In some embodiments, the communications processing unit may include Virtual Private Network (VPN) software for securely connecting to the server over the network, and may be further configured to instantiate a VPN session with the server via the VPN software. The VPN session may enable communications between components or devices connected to the communications processing unit and any systems or networks to which the server provides access.

In some embodiments, communications over the network communication channel may be encrypted and/or compressed. Any encryption or data compression schemes may be used as desired. In one embodiment, the communications processing unit may be further configured to execute Wide Area Network (WAN) optimization software to optimize remote communications over the network communication channel.

In a further embodiment, the communications processing unit may be further configured to identify packets associated with a specified Bluetooth device. In other words, the communications processing unit may be able to determine which Bluetooth devices are associated with which communication packets, e.g., as senders or receivers of the packets. The communications processing unit may then present various options to the user that take advantage of this functionality. For example, in some embodiments, the communications processing unit may be configured to, in response to user input, log communications related to the specified Bluetooth device, forward communications related to the specified Bluetooth device to a remote server whose address has been user configured in configuration settings of the communications processing unit, prevent forwarding of packets for the specified USB device, or accelerate or prioritize transmission of packets related to the specified Bluetooth device, among other actions.

Figure 9:
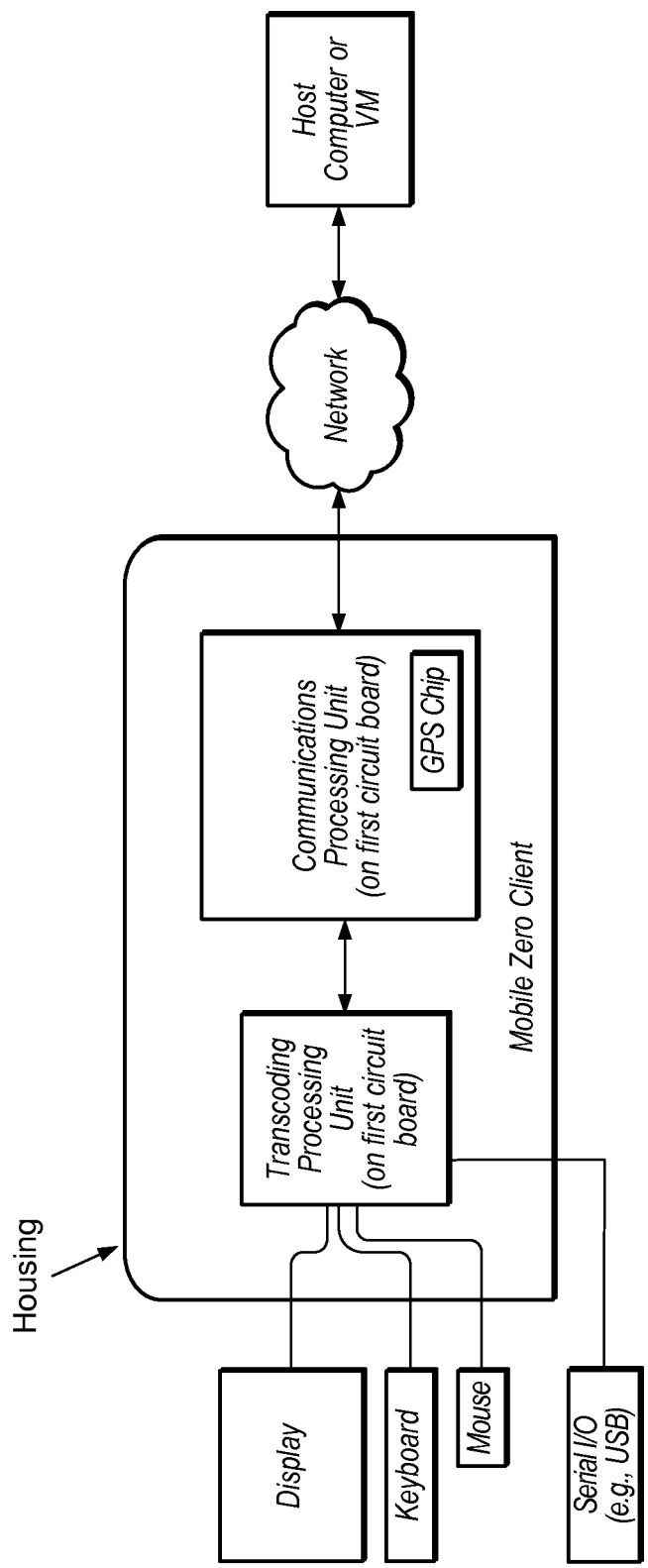
FIG. 9 illustrates integration of GPS capability into a zero client device, according to one embodiment.

FIG. 9—Integration of GPS Capability into a Mobile Zero Client Device

FIG. 9 illustrates integration of Global Positioning System (GPS) capability into a zero client device, according to one embodiment. More specifically, in some embodiments, a GPS chip (or module) may be incorporated into the zero client architecture. For example, the GPS chip may be paired with the communications processing unit that is part of the zero client architecture described above. The GPS chip may provide location information concerning the client. The GPS coordinate access software may execute on the communications processing unit and hence may not require the transcoding processing unit to have an active connection to a remote virtual machine or host computer.

In one exemplary embodiment, the zero client device may be a mobile zero client device that includes a housing, a transcoding processing unit, included in the housing and implemented on a first circuit board, and a communications processing unit, also included in the housing, implemented on a second circuit board, and coupled to the transcoding processing unit. The communications processing unit may be configured to connect to devices over a network, and may include a GPS (Global Positioning System) chip configured to provide location information of the zero client device. Accordingly, the communications processing unit may be further configured with GPS coordinate access software for communicating with the GPS chip. The zero client device may have no user-modifiable storage medium.

The communications processing unit may be configured to determine an identifier of a server to which connection is desired, and provide a network communication channel to the transcoding processing unit for accessing the server. The transcoding processing unit may be configured to instantiate the zero client session with the server through the network communication channel provided by the communications processing unit, then receive input data from one or more human interface devices, encode the input data, and provide the encoded input data to the communications processing unit for transmission over the network to the server via the zero client session.

The communications processing unit may be configured to receive the encoded input data from the transcoding processing unit, transmit the encoded input data over the network to the server via the zero client session, receive output data from the server over the network via the zero client session, and send the output data to the transcoding processing unit, which may be further configured to receive the output data from the communications processing unit, decode the output data, thereby generating decoded output data, and send the decoded output data to at least one of the one or more human interface devices.

The coordinates obtained from the GPS chip can be stored (e.g., archived) to processor memory of the communications processing unit, and used for any of a variety of purposes. For example, in one embodiment, the communications processing unit may be configured to store coordinates obtained from the GPS chip to processor memory of the communications processing unit for use by the zero client device and for optional access via a remote management console or other network based entity, and send coordinates obtained from the GPS chip to a specified connection broker (or other server or service) at a configurable temporal frequency. To determine the identifier of the server, the communications processing unit may be configured to receive a network address of the server from the connection broker based on proximity of the server to the zero client device determined via the sent coordinates.

In another embodiment, the communications processing unit may be configured to store coordinates obtained from the GPS chip to processor memory of the communications processing unit for use by the zero client device and for optional access via a remote management console or other network based entity, send coordinates obtained from the GPS chip to a pre-configured remote server at a configurable temporal frequency, and either trigger a shut down of the mobile zero client in response to detecting that the device is outside an authorized area based on the coordinates obtained from the GPS chip, or trigger destruction of the mobile zero client in response to detecting that the device is outside the authorized area based on the coordinates obtained from the GPS chip. For example, in one embodiment, destruction of the zero client device may simply involve damage to some critical component in the device that renders it irreversibly inoperable.

In one embodiment, the communications processing unit may include Virtual Private Network (VPN) software for securely connecting to the server over the network, and the communications processing unit may be further configured to instantiate a VPN session with the server via the VPN software, wherein the VPN session enables communications between components or devices connected to the communications processing unit and any systems or networks to which the server provides access.

In some embodiments, communications over the network communication channel may be encrypted and/or compressed. Any encryption or data compression schemes may be used as desired. In one embodiment, the communications processing unit may be further configured to execute Wide Area Network (WAN) optimization software to optimize remote communications over the network communication channel.

In a further embodiment, the communications processing unit may be further configured to automatically modify data transmitted via the network communication channel by changing the protocol type or one or more connectivity parameters based on the location information of the zero client device provided by the GPS chip. The one or more connectivity parameters may include one or more of maximum transmission unit (MTU), or one or more IP/TCP/UDP stack connection parameters. Examples of IP/TCP/UDP stack connection parameters include, but are not limited to, tcp_time_wait_interval, tcp_close_wait_interval, tcp_fin_wait_2_flush_interval, tcp_keepalive_interval, tcp_ip_abort_linterval, tcp_rexmit_interval_initial, tcp_rexmit_interval_min, tcp_ip_abort_interval, tcp_ip_abort_linterval, tcp_ip_abort_cinterval, udp_smallest_anon_port, tcp_smallest_anon_port, udp_largest_anon_port, tcp_largest_anon_port, udp_smallest_nonpriv_port, tcp_smallest_nonpriv_port, tcp_extra_priv_ports_add, udp_extra_priv_ports_add, write-only action, tcp_extra_priv_ports_del, udp_extra_priv_ports_del, write-only action, tcp_extra_priv_ports, and udp_extra_priv_ports, among others.

In some embodiments, the communications processing unit may include configuration settings, including one or more rules specifying location ranges associated with respective connectivity parameters.

Note that the novel functionalities of the above described embodiments depend not only on the GPS components (e.g., the GPS chip) within the housing of the zero client, but also on at least one software application (or program) which executes (or is implemented) on the zero client communications processing unit (or the transcoding processing unit) which reads GPS coordinates from the GPS chip and performs or invokes one or more actions. For example, in some embodiments, the at least one program may to a) transmit these coordinates to a central server which processes rules that guide the software application's behavior and actions, e.g., wipe configuration data, destroy firmware on the client in the event that the zero client device is removed from a secure facility, and b) transmit these coordinates back to a remote host to which the zero client is connected. As zero client communication protocols may not be designed to carry GPS coordinates or location data, an auxiliary or redirection channel may be established between the software application running on the zero client communications processing unit and a (e.g., small) agent running on the remote host. The agent running on the remote host may receive the GPS data and in some embodiments may either invoke local processes which process the GPS data, or cache the GPS data so that applications running on the remote system can query the agent for the current position of the zero client device.

Figure 10:
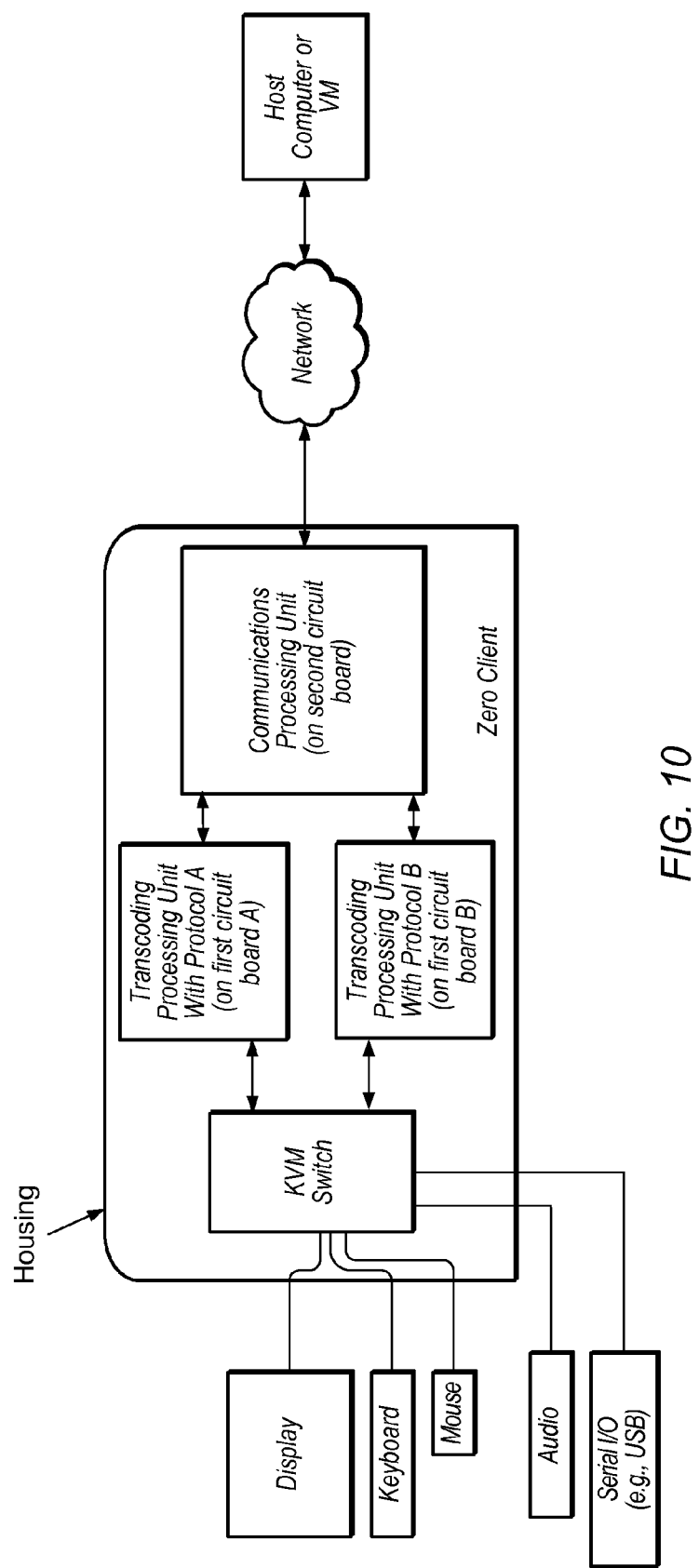
FIG. 10 illustrates integration of multi-boot capability into a zero client device to allow use of multiple zero client protocols from the same zero client device, according to one embodiment.

FIG. 10—Integration of Multi-Boot Capability to Allow the Use of More than One Zero Client Protocol from the Same Zero Client Device FIG. 10 illustrates integration of multi-boot capability into a zero client device to allow use of multiple zero client protocols from the same zero client device, according to one embodiment. In one embodiment, the zero client device may include two or more transcoding processing units, each running a different zero client protocol, such as PCoIP and RemoteFX (or others). The user may be able to select which protocol he/she wishes to use and the client may initialize the corresponding transcoding processing unit and connect it to the local peripherals (e.g., keyboard, mouse, USB, audio, etc.) and display, e.g., human interface devices.

More specifically, in some exemplary embodiments, the zero client device may include a housing, and two or more transcoding processing units, included in the housing, where each of the two or more transcoding processing units is implemented on a respective first circuit board (e.g., boards A, B, etc., with one circuit board per transcoding processing unit). Each of the two or more transcoding processing units may be configured to execute a respective zero client protocol.

The zero client device may further include a communications processing unit, included in the housing, implemented on a second circuit board, and coupled to the two or more transcoding processing units. The communications processing unit may be configured to connect to devices over a network. As above, the zero client device may have no user-modifiable storage medium.

In some embodiments, the zero client device may be configured to receive user input selecting a zero client protocol of the two or more transcoding processing units for operation, select and initialize a transcoding processing unit (of the two or more transcoding processing units) corresponding to the selected zero client protocol, and establish a connection between the transcoding processing unit and human interface devices, including one or more peripheral devices and a display device.

The communications processing unit may be configured to determine an identifier of a server to which connection is desired, and provide a network communication channel to the selected transcoding processing unit for accessing the server. Accordingly, the selected transcoding processing unit may be configured to instantiate a zero client session with the server through the network communication channel provided by the communications processing unit.

Additionally, the selected transcoding processing unit may be further configured to receive input data from one or more human interface devices, encode the input data, and provide the encoded input data to the communications processing unit for transmission over the network to the server via the zero client session. The communications processing unit may be configured to receive the encoded input data from the selected transcoding processing unit, transmit the encoded input data over the network to the server via the zero client session, receive output data from the server over the network via the zero client session, and send the output data to the selected transcoding processing unit, which may be further configured to receive the output data from the communications processing unit, decode the output data; and send the decoded output data to at least one of the one or more human interface devices.

Thus, multiple zero client protocols may be supported by respective selectable transcoding processing units in one zero client device.

In a further embodiment, a KVM (keyboard/video/mouse) switch may be integrated within the zero client device, e.g., included in the housing, such that any one of the transcoding processing units may be connected to the display and peripherals (e.g., human interface devices, etc.), while the other(s) still maintains an open connection with the server or host and remains fully functional. Thus, the user may switch to other in-progress zero (or cloud) client protocol connections by exercising a dial, switch, or button on a graphical user interface (GUI) for the client, e.g., on the zero (or cloud) client's front panel, which invokes the KVM to disconnect from the current transcoding processing unit and initiate a connection with a different transcoding processing unit, e.g., the next transcoding processing unit in line.

In one embodiment, all circuit boards, cards, etc., present in the zero client device may be powered by a single integrated power supply. In other words, the zero client device may include a single integrated power supply, included in the housing, and configured to provide power to the zero client device.

Further, in some embodiments, an optional IP switch may be included in the client which may be configured to aggregate network connections (uplinks) from each of the two or more transcoding processing units present into a single external connection. This single connection may, for example, be located on the backpanel of the client housing, i.e., enclosure or case.

Moreover, in some embodiments, one or more other processors may be included in the zero client device. For example, one or more x86, ARM or PowerPC systems (circuit or processor system boards) may be included within the same enclosure with the two or more transcoding processing units running a zero client protocol. These individual systems may all be interfaced via a KVM switch that can be used to drive the local display and peripherals, and connect them with any of the selected systems (circuit or processor system boards). In another embodiment, a physical front panel, e.g., a graphical color LCD display front panel (or any other display type), may be provided, which may function as a user interface to the KVM switch, and which may provide an indication of which system (e.g., of the decoder processing unit, x86, ARM or PowerPC system) the external peripherals (e.g., user interface devices) are currently connected to.

In one embodiment, the communications processing unit may include Virtual Private Network (VPN) software for securely connecting to the server over the network, and may be further configured to instantiate a VPN session with the server via the VPN software, where the VPN session enables communications between components or devices connected to the communications processing unit and any systems or networks to which the server provides access.

In some embodiments, each of the one or more processor system boards may be configured to connect to and communicate with the human interface devices, and each of the two or more transcoding processing units and the one or more processor system boards may be configured to drive a respective display device coupled to the zero client device.

For example, in one embodiment, two or more of the transcoding processing units may be configured to connect to a display capable of accepting multiple inputs and providing "Picture in Picture" capability, thereby allowing "Picture in Picture" display for simultaneous zero client sessions.

In some embodiments, software based keyboard and mouse sharing may allow the keyboard and mouse to operate across all displays even though they are driven by different systems all housed within the client enclosure. Audio output may be multiplexed and fed to a speaker system via a single line out. Audio input may be aggregated so that a single microphone feeds all internal boards/systems. In other words, audio inputs to at least one transcoding processing unit and the one or more processor system boards may be aggregated so that a single microphone feeds the at least one transcoding processing unit and the one or more processor system boards.

In some embodiments, communications over the zero client session may be encrypted and/or compressed. Any encryption or data compression schemes may be used as desired. In one embodiment, the communications processing unit may be further configured to execute Wide Area Network (WAN) optimization software to optimize remote communications in the zero client session.

In a further embodiment, the communications processing unit may be further configured to identify packets associated with a specified zero client session. In other words, the communications processing unit may be able to determine which zero client sessions are associated with which communication packets, e.g., as senders or receivers of the packets. The communications processing unit may then present various options to the user that take advantage of this functionality. For example, in some embodiments, the communications processing unit may be configured to, in response to user input, log communications related to the specified zero client session, forward communications related to the specified zero client session to a remote server whose address has been user configured in configuration settings of the communications processing unit, prevent forwarding of packets for the zero client session, or accelerate or prioritize transmission of packets related to the specified zero client session, among other actions.

Figure 11:
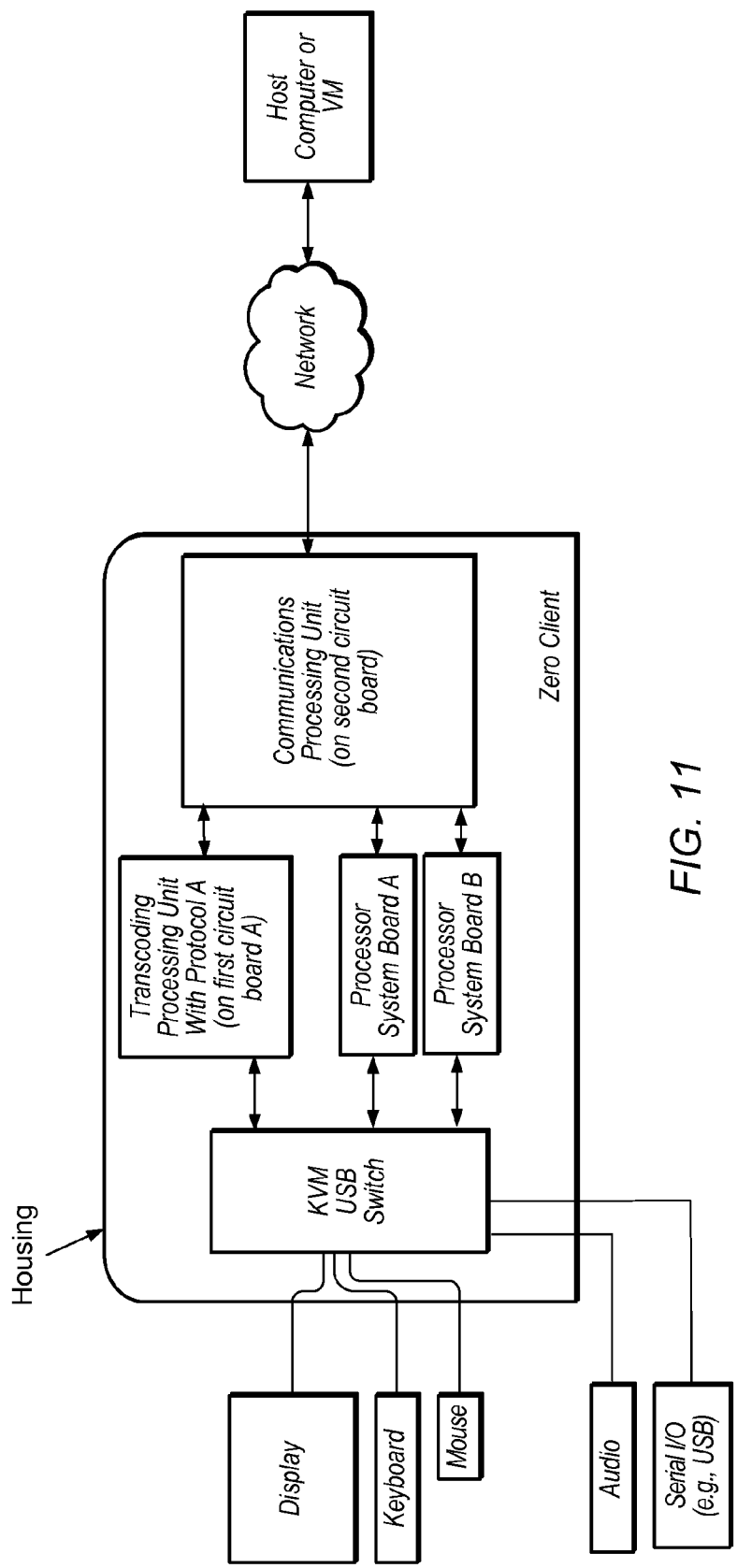
FIG. 11 illustrates integration of secure KVM (keyboard/video/mouse) switching capability into a zero client device, according to one embodiment.

FIG. 11—Secure KVM Switching in a Zero Client Device

FIG. 11 illustrates integration of secure KVM (keyboard/video/mouse) switching capability into a zero client device, according to one embodiment. In some embodiments, a keyboard, video, audio, display, and USB sharing switch (which may be referred to herein as a KVM and USB switch (or simply a KVM switch) for convenience) may be provided which may allow multiple, e.g., N, computing systems to connect to one or more (e.g., 1 to M) displays, a single keyboard, a single mouse, a single set of speakers, and/or a set of USB ports. Compared to prior art KVM technology, the novel KVM switching functionality disclosed herein provides or facilitates functionality and benefits not available with the prior art, some of which are described below.

In one embodiment, a microcontroller may control the (KVM) switching, and may log a switching event every time a switch action is initiated by the user, e.g., The user may initiate this action by exercising a dial, switch, or button attached externally to the casing housing the switch. The logged event may be stored to memory attached to the microcontroller and may include a timestamp, the port to which the session was switched (i.e., the computing system/board which was activated), and/or other attributes, e.g., environmental elements, which, for example, may include the ID of the user, GPS coordinates obtained from an optionally integrated GPS chip, and/or other similar attributes. This log may be used for audit and security verification purposes.

In one embodiment, the microcontroller may be programmed with rules on a one-off basis, or by obtaining a rule set from a network location. These rules may control some or all aspects of the operation of the switch. Exemplary examples of such rules may include:

a. do not allow switching to Port A during the hours 8 am to 5 pm;
    b. if the user switches to Port B, shut the system down;
    c. if the user switches to Port A, send a network event via SNMP, Email, Page or any other notification system;
    d. if the user switches away from Port A, take any actions described above;
    e. if the user switches away from Port A, power down the system connected to Port A;
    f. if the user tries to switch to Port B provide a warning or informational message on screen; or
    g. if the user tries to switch away from Port B, provide a warning or informational message on an optional LCD attached to the KVM enclosure. Note, however, that the above rules are exemplary only, and are not intended to limit the rules implemented to any particular set of rules.

In another embodiment, the microcontroller may optionally be connected to a network (IP) port so that a management console or other management software present on the same network can contact the microcontroller. Once contact is established, this link can be used to perform any of various functions, such as, for example, a. update the rule set on the microcontroller;
    b. change notification settings;
    c. adjust time or clock settings;
    d. obtain the captured log file (described above);
    e. run diagnostic tests;
    f. remotely restart the system;
    g. remotely force a connection to any available port; or
    h. remotely force a shutdown of the system.

Note that the above actions are exemplary only, and are not intended to limit the actions implemented to any particular set of actions. Note that each of the logging, audit trail, and rule based operational aspects described herein are unavailable with prior art systems.

In some embodiments, the above secure KVM technique may be incorporated in a zero client device. For example, in one embodiment, the zero client device may include a housing, a transcoding processing unit, included in the housing, and implemented on a first circuit board, and a communications processing unit, included in the housing, implemented on a second circuit board, and coupled to the transcoding processing unit. The communications processing unit may be configured to connect to devices over a network. The zero client device may further include one or more processor system boards, also included in the housing, as well as a KVM (keyboard video mouse) and USB switch, included in the housing, and configured to connect human interface devices to at least one of the one or more processor system boards or the transcoding processing unit in response to user input. The zero client device may have no user-modifiable storage medium.

The communications processing unit may be configured to determine an identifier of a server to which connection is desired, and provide a network communication channel to the transcoding processing unit for accessing the server. The transcoding processing unit may be configured to instantiate the zero client session with the server through the network communication channel provided by the communications processing unit, and may be further configured to receive input data from one or more human interface devices via the KVM and USB switch, encode the input data, and provide the encoded input data to the communications processing unit for transmission over the network to the server via the zero client session.

The communications processing unit may be configured to receive the encoded input data from the transcoding processing unit, transmit the encoded input data over the network to the server via the zero client session, receive output data from the server over the network via the zero client session, and send the output data to the transcoding processing unit, which may be configured to receive the output data from the communications processing unit, decode the output data, and send the decoded output data to at least one of the one or more human interface devices via the KVM and USB switch.

In some embodiments, the communications processing unit may include Virtual Private Network (VPN) software for securely connecting to the server over the network, and may be further configured to instantiate a VPN session with the server via the VPN software. The VPN session may enable communications between components or devices connected to the communications processing unit and any systems or networks to which the server provides access.

In one embodiment, the zero client device may further include a color display front panel, included in or on the housing, and coupled to the KVM and USB switch. The color display front panel may include or implement a user interface to the KVM and USB switch and provide an indication as to which of the one or more processor system boards and the at least one transcoding processing unit the user interface devices are currently connected.

The KVM and USB switch may be further configured to switchably and simultaneously connect each of the transcoding processing unit and the one or more processor system boards to a respective display device, and the communications processing unit may be configured with program instructions implementing software based keyboard and mouse sharing that allows the keyboard and mouse to span all display devices coupled to the transcoding processing unit and the one or more processor system boards, respectively.

In some embodiment, audio output from the zero client device may be multiplexed and fed to a speaker system via a single line out, and audio inputs to the zero client device may be aggregated so that a single microphone feeds the transcoding processing unit and the one or more processor system boards.

In further embodiments, additional security related functionality may be provided in or by the KVM and USB switch and/or the zero client device. For example, in one embodiment, the KVM and USB switch may include one or more tamper proof sensors configured to detect whether the housing has been opened. Exemplary sensors include, but are not limited to, light sensors, contact sensors, magnetic sensors, or any other types of sensors that can detect whether the zero client housing has been opened.

Moreover, in some embodiments, the KVM and USB switch may be further configured to perform an action in response to at least one of the one or more tamper proof sensors detecting that the housing has been opened. Examples of actions that may be performed include, but are not limited to, one or more of: disable itself (i.e., the KVM and USB switch), use electrical surges or programmed instructions to disable any connected zero client devices, log the detection, or use programmed instructions to send a tamper notification to a connected device of the detection, wherein the tamper notification is useable by the connected device to take its own action, e.g., disable itself, log the detection, or display the tamper notification visually, etc.).

Figure 12:
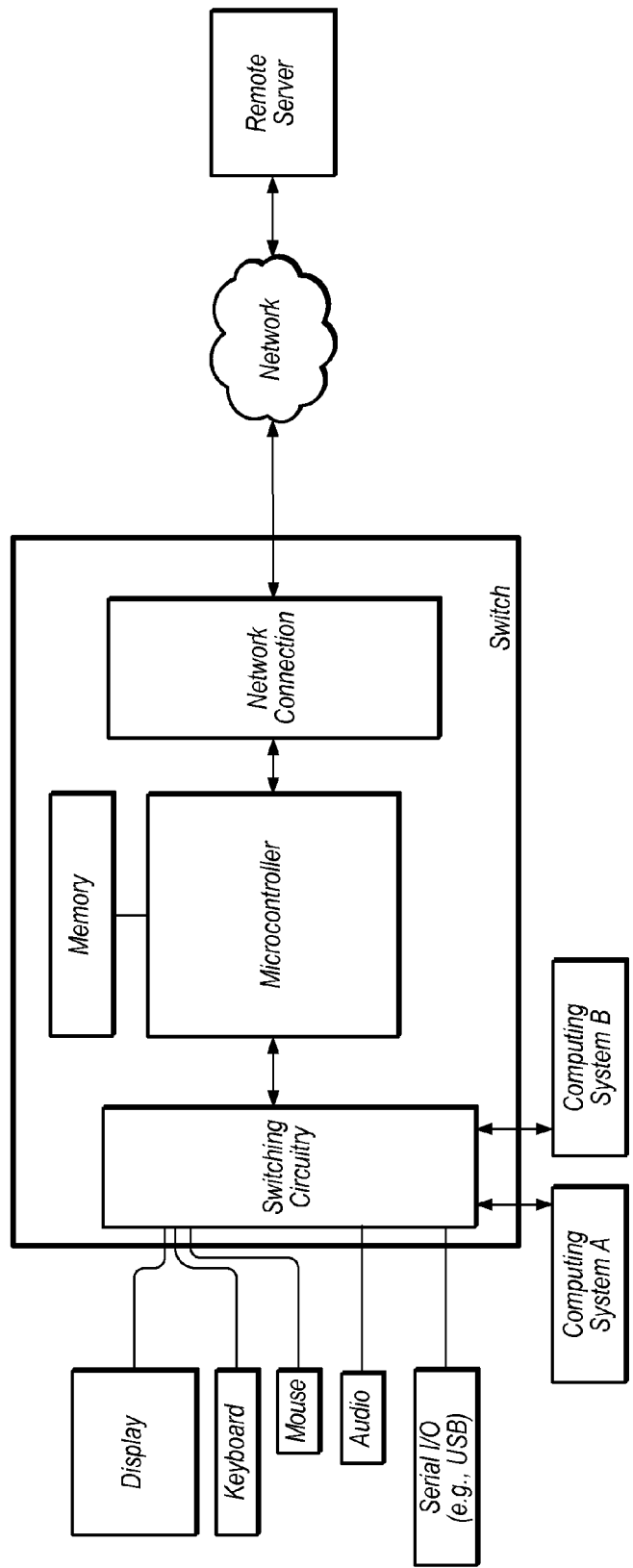
FIG. 12 illustrates a network controlled serial/audio switch, according to one embodiment.

FIG. 12—Network Controlled USB/RJ-45 and Audio Switch

FIG. 12 illustrates one embodiment of a network controlled serial/audio switch. As shown, in one embodiment, multiple RJ-45, USB, and audio inputs may be provided to connect to a single RJ-45, USB, and audio output (respectively). For example, in one exemplary embodiment a network controlled switch may be provided that includes multiple serial, e.g., RJ-45, inputs, multiple USB inputs, multiple audio inputs, a single RJ-45 output, a single USB output, a single audio output, and multiplexing circuitry, connected to each of the multiple RJ-45 inputs, the multiple USB inputs, the multiple audio inputs, the single RJ-45 output, the single USB output, and the single audio output. The multiplexing circuit (and thus, the switch) may be configured to receive (RJ-45) data from the multiple RJ-45 inputs, and provide the (RJ-45) data to the single RJ-45 output. Similarly, multiplexing circuit (and thus, the switch) may be configured to receive (USB) data from the multiple USB inputs, and provide the (USB) data to the single USB output. The multiplexing circuit (and thus, the switch) may further be configured to receive data (i.e., audio signals) from the multiple audio inputs, and provide the data to the single audio output. Other embodiments are also contemplated. For example, the particular types of port categories/protocols may be different, or additional ports/protocols may be included.

As indicated in FIG. 12, in one exemplary embodiment, the switch may include a microcontroller, a memory, coupled to the microcontroller, a network connection, coupled to the microcontroller, for providing IP (Internet Protocol) connectivity to a remote server, and switching circuitry, coupled to the microcontroller. The switching circuitry may be configured to connect to multiple computing systems, connect to one or more user interface devices or serial I/O ports, and receive user input instructing the switching circuitry to switch to any one of the multiple computing systems to which it is connected.

The memory may store program instructions executable by the microcontroller to configure the switching circuitry to connect any of the multiple computing systems to the one or more interface devices or serial I/O ports, and query a remote server via the network connection to determine whether the user input instructing the switching circuitry to connect to any of the multiple computing systems is permissible based on any of a variety of criteria, including, for example, one or more of: time of day, a user identifier (ID) of the user providing the user input to the switching circuitry, a geographical or network location of the switch, a type, geographical location, IP address range, or gateway of the network connection, a server-defined flag or semaphore, or an ID of a computing system to which the switching circuitry is instructed to connect, among others.

Thus, in some embodiments, the switch may include a microcontroller and memory, similar to the KVM switch discussed above. Accordingly, logging, rules, and network based management functionality similar to that described above may also be implemented as desired.

In one embodiment, the one or more user interface devices may include one or more of: one or more display devices, a keyboard, a mouse, or a set of speakers, among others.

In some embodiments, the program instructions may be executable to configure the switching circuitry in response to user input to the switch selecting one of the multiple computing systems for a session, and may be further executable by the microcontroller to log an event in the memory in response to each switch action initiated by the user. The logged event may include, but is not limited to, one or more of: a timestamp, or a port or computing system to which the session was switched. The log may be useable for audit and security verification purposes, as desired. In one embodiment, the logged event may further include the ID of the user. In some embodiments, the switch may further include a GPS (global positioning system) chip configured to provide GPS coordinates of the switch. The logged event may accordingly further include GPS coordinates obtained from the GPS chip when the switch action was initiated. In some embodiments, the program instructions may be further executable by the microcontroller to implement switching rules for the switch.

In one embodiment, the switch may also include a network IP port for connecting to a network, and the program instructions may be further executable by the microcontroller to connect the switch to a network device with management software, and perform one or more functions in response to input from the management software.

Additionally, in some embodiments, communications over the network connection may be encrypted and/or compressed, via any encryption or compression schemes desired. Moreover, in one embodiment, the memory may store Wide Area Network (WAN) optimization software executable by the microcontroller to optimize communications over the network connection.

It should be noted that each of the above-described system embodiments may be used to perform corresponding methods, where each system element performs its respective functionality during operation of the system as a method element.

Various embodiments may further include receiving or storing instructions and/or information implemented in accordance with the foregoing description upon a carrier medium. Suitable carrier media may include storage media or memory media such as magnetic or optical media, e.g., disk or CD-ROM, as well as transmission media or signals such as electrical, electromagnetic, or digital signals, conveyed via a communication medium such as a network and/or a wireless link.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

We claim:

1. A zero client device, comprising:
   a housing;
   a transcoding processing unit, comprised in the housing, wherein the transcoding processing unit comprises a first circuit board, and wherein the transcoding processing unit implements a zero client protocol for conducting zero client sessions;
   a communications processing unit, comprised in the housing and interfaced to the transcoding processing unit, wherein the communications processing unit comprises a second circuit board, wherein the communications processing unit comprises Virtual Private Network (VPN) software for securely connecting to devices over a network; and
   an uplink network connection, comprised in the housing, wherein the uplink network connection is comprised in or interfaced to the communications processing unit for connecting to a network;
   wherein the zero client device has no user-modifiable storage medium, but does include one or more memory elements for operation of the zero client device;
   wherein the communications processing unit is configured to:
     determine an identifier of a server to which connection is desired;
   wherein the transcoding processing unit is configured to:
     instruct the communications processing unit to instantiate a VPN session with the server;
   wherein the communications processing unit is configured to:
     instantiate the VPN session with the server via the VPN software in response to the instruction from the transcoding processing unit, wherein the VPN session enables communications between components or devices connected to the communications processing unit and any systems or networks to which the server provides access;
   wherein the transcoding processing unit is configured to:
     instantiate a zero client session with the server via the VPN session using the zero client protocol;
   wherein the transcoding processing unit is further configured to:
     receive input data from one or more human interface devices;
     encode the input data; and
     provide the encoded input data to the communications processing unit for transmission over the network to the server via the zero client session using the zero client protocol;
   wherein the communications processing unit is configured to:
     receive the encoded input data from the transcoding processing unit;
     transmit the encoded input data over the network to the server via the zero client session using the zero client protocol;
     receive output data from the server over the network via the zero client session using the zero client protocol; and
     send the output data to the transcoding processing unit wherein the transcoding processing unit is further configured to:
receive the output data from the communications processing unit;
decode the output data; and
send the decoded output data to at least one of the one or more human interface devices
wherein the zero client device has no independent operational capability other than acting as a decoder or receiver for a computing experience that executes on a remote computer and is transmitted over a network to the zero client device.

2. The zero client device of claim 1, wherein the communications processing unit is further configured to execute Wide Area Network (WAN) optimization software to optimize remote communications in the VPN session.

3. The zero client device of claim 1, wherein the communications processing unit is configured to forward a copy of all data associated with the VPN session to a secondary remote server whose address is pre-configured by the user in configuration settings of the communications processing unit.

4. The zero client device of claim 1, wherein the communications processing unit is configured to report on the usage and connection statistics associated with the VPN session to a secondary remote server whose address is pre-configured by the user in configuration settings of the communications processing unit.

5. The zero client device of claim 4, wherein the usage and connection statistics comprise one or more of:
whether and when the zero client device is connected or not;
data transmission rates;
data transmission amounts;
time of connection; or
connection destination.

* * * * *